US007152462B2

(12) United States Patent
Hinterdorfer et al.

(10) Patent No.: US 7,152,462 B2
(45) Date of Patent: *Dec. 26, 2006

(54) TOPOGRAPHY AND RECOGNITION IMAGING ATOMIC FORCE MICROSCOPE AND METHOD OF OPERATION

(75) Inventors: Peter Hinterdorfer, Linz (AT); Jeremy Nelson, Mesa, AZ (US); Stuart M. Lindsay, Phoenix, AZ (US)

(73) Assignee: Agilent Technologies, Inc, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/152,827

(22) Filed: Jun. 14, 2005

(65) Prior Publication Data
US 2006/0016251 A1  Jan. 26, 2006

Related U.S. Application Data

(63) Continuation of application No. 10/697,841, filed on Oct. 30, 2003, now Pat. No. 6,952,952.

(60) Provisional application No. 60/423,222, filed on Nov. 1, 2002.

(51) Int. Cl.
*G01B 5/28* (2006.01)
(52) U.S. Cl. .................. 73/105; 250/306; 250/307
(58) Field of Classification Search .................. 73/105; 250/306, 307
See application file for complete search history.

(56) References Cited

U.S. PATENT DOCUMENTS

| 5,383,354 A | 1/1995 | Doris et al. |
| 5,513,518 A | 5/1996 | Lindsay |
| 5,515,719 A | 5/1996 | Lindsay |
| 5,519,212 A | 5/1996 | Elings et al. |
| 6,008,489 A | 12/1999 | Elings et al. |
| 6,952,952 B1* | 10/2005 | Hinterdorfer et al. ......... 73/105 |

OTHER PUBLICATIONS

Baumgartner et al., "Cadherin interaction probed by atomic force microscopy", PNAS, Apr. 11, 2000, vol. 97, No. 8, pp. 4005-4010.
Raab et al., "Antibody recognition imaging by force microscopy", Nature Biotechnology, vol. 17, Sep. 1999, pp. 902-905.
Hinterdorfer et al., "Detection and localization of individual antibody-antigen recognition events by atomic force microscopy", Proc. Natl. Acad. Sci. USA, vol. 93, Apr. 1996, pp. 3477-3481.
Keinbrger et al., "Static and Dynamical Properties of Single Poly(Ethylene Glycol) Molecules Investigated by Force Spectroscopy", Single Mol. 1 (2000) 2, pp. 123-128.
Han et al., A magnetically driven oscillating probe microscope for operation in liquids:, Appl. Phys. Lett. 69 (26), Dec. 23, 1996, pp. 4111-4113
Lee et al., "Sensing Discrete Streptavidin-Biotin Interactions with Atomic Force Microscopy", Langmuir 1994, 10, pp. 345-357.

(Continued)

*Primary Examiner*—Michael Cygan

(57) ABSTRACT

A recognition force microscope for detecting interactions between a probe and a sensed agent on a scanned surface and methods for its operation are provided. The microscope includes a scanning probe having a tip that is sensitive to a property of the scanned surface, and the probe is adapted to oscillate with a low mechanical Q factor. Operation of the microscope includes recording the displacement of the probe tip as a function of time and simultaneously recording both topographic images and the spatial location of interactions between said probe and one or more sensed agents on the surface.

4 Claims, 21 Drawing Sheets

OTHER PUBLICATIONS

Hinterdorfer et al., "A Mechanistic Study of the Dissoclation of Individual Antibody-Antigen Pairs by Atomic Force Microscopy", Nanobiology, 1998, vol. 4, pp. 177-188.

Sulchek et al., "High-speed mode imaging with active Q control for atomic force microscopy", Applied Physics Letter, American Institute of Physics, New York, US., vol. 76, No. 11, Mar. 13, 2000, pp. 1473-1475.

Shubeita et al., "Scanning near-field optical microscopy based on the heterodyne phase-controlled oscillator method", Journal of Applied Physics, American Institute of Physics, New York, US, vol. 88, No. 5, Sep. 1, 2000, pp. 2921-2927.

Wong et al., Nature Jul. 1998 v394 pp. 52-55.

Sinniah et al., "Solvent Exclusion and Chemical Contrast in Scanning Force Microscopy", J. Am. Chem. Soc. 1996 V1118, pp. 8925-8931.

McKendry et al., "Chiral discrimination by chemical force microscopy", Nature, Feb. 1998, pp. 566-568.

Yazdani et al, "Up close and personal to atoms" Nature, Sep. 1999, v401 p. 227.

Abenden et al., "Surface Characterization of Cholesterol Monohydrate Single Crystals by Chemical Force Microscopy", Langmuir, 2002, v18, pp. 4847-4853.

Noy et al., "Chemical Force Microscopy: Exploiting Chemically-Modified Tips to Quantify Adhesion, Friction, and Functional Group Distributions in Molecular Assemblies", J. Am. Chem. Soc. 1995, v117, pp. 7943-7951.

Overney et al., "Force Microscopy Study of Friction and Elastic Compliance of Phase-Separated Organic Thin Films", Langmuir, 1994, v10, pp. 1281-1286.

* cited by examiner

RECOGNITION

TOPOGRAPHY

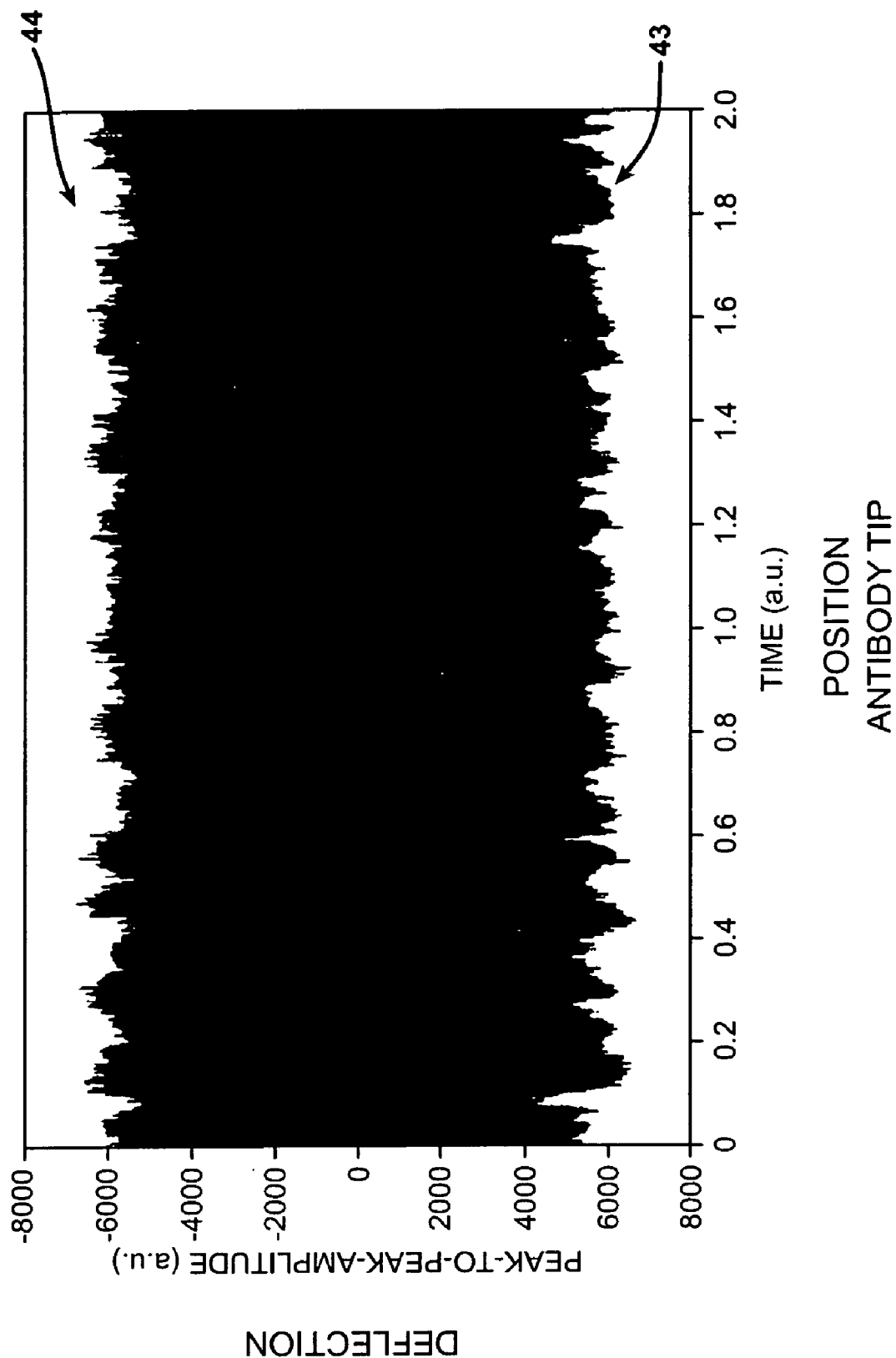

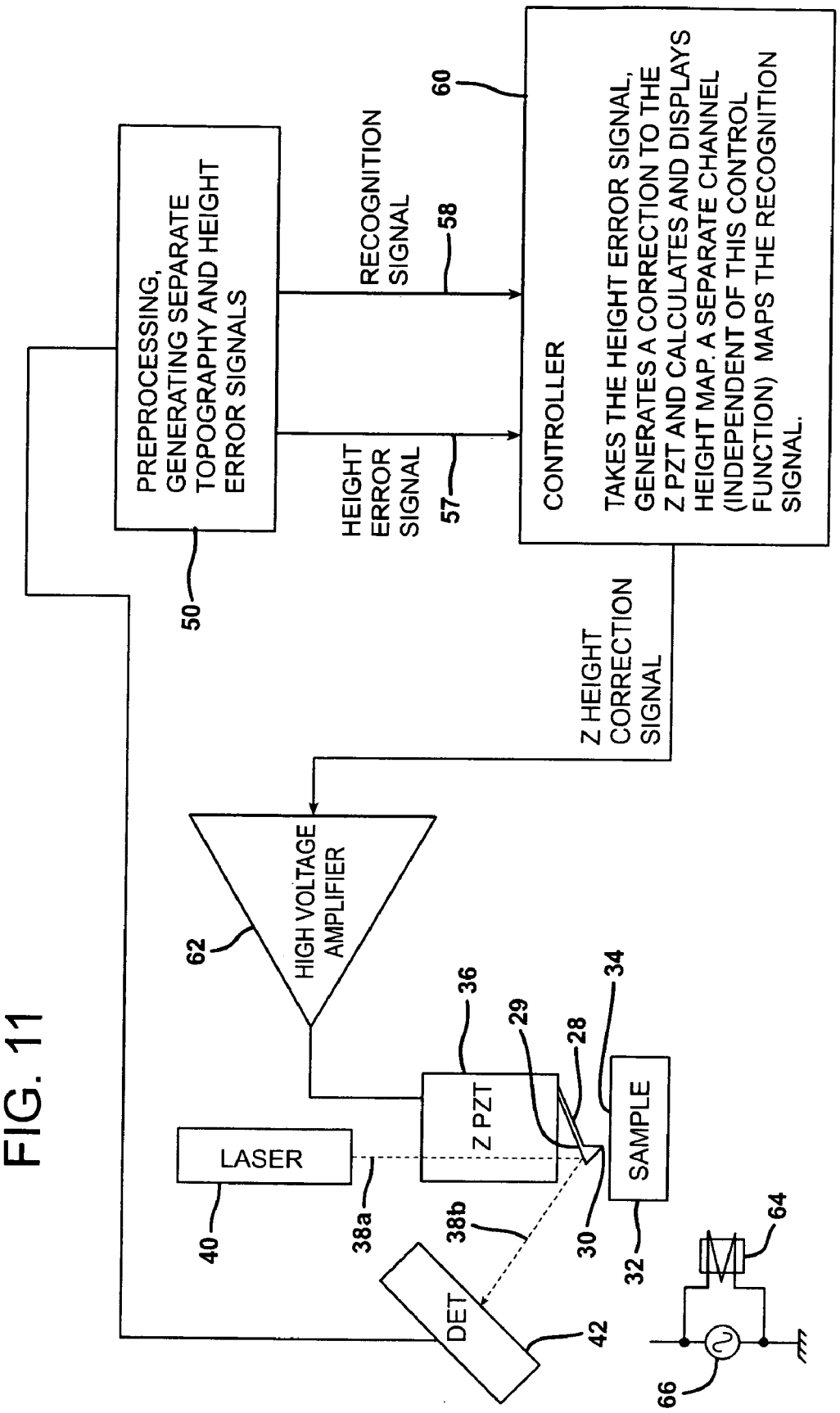

TOPOGRAPHY AND RECOGNITION IMAGING ATOMIC FORCE MICROSCOPE AND METHOD OF OPERATION

CROSS-REFERENCE TO RELATED APPLICATIONS

This application is a continuation of U.S. patent application Ser. No. 10/697,841, filed Oct. 30, 2003, now U.S. Pat. No. 6,952,952, issued Oct. 11, 2005. This application also claims priority to U.S. Provisional Application Ser. No. 60/423,222, filed Nov. 1, 2002.

BACKGROUND OF THE INVENTION

The present invention relates to an atomic force microscope and methods of operating that microscope to provide both topographic and recognition imaging, and more particularly to an atomic force microscope for detecting interactions between a probe and a sensed agent on the surface of a substrate to provide simultaneous topographic and recognition images.

It has long been recognized that the atomic force microscope can be made to be sensitive to specific chemical interactions between a probe tip and a surface. For example, Lee et al., "Sensing discrete streptavidin-biotin interactions with atomic force microscopy," Langmuir 10:354–357 (1994), demonstrated specific binding between biotin and streptavidin using chemically modified cantilever probes. Another example of a specific interaction between chemically reactive groups is given by Kienberger et al., "Static and dynamical properties of single poly (ethylene glycol) molecules investigated by force microscopy," Single Molecules 1:123–128 (2000).

A method for attaching antibodies to a scanned probe has been described by Hinterdorfer et al., "Detection and localization of individual antibody-antigen recognition events by atomic force microscopy," Proc. Natl. Acad. Sci. (USA) 93: 3477–3481 (1996); "Force spectroscopy of anti-body-antigen recognition measured by scanning force microscopy." Biophys. J. 74:186 (1998); and "A mechanistic study of the dissociation of individual antibody-antigen pairs by atomic force microscopy," Nanobiology 4:39–50 (1998). This method has been used to characterize interactions between several antibody-antigen pairs. The method has also been used to characterize interactions between adhesive proteins (Baumgartner, Hinterdorfer et al., "Cadherin interaction probed by atomic force microscopy." Proc. Natl. Acad. Sci. USA 97 (2000)) and between ligands and transporter molecules embedded in native protein membranes.

Those skilled in the art will recognize that the technique is quite general and applicable to any set of materials that bind to one another—receptors with their corresponding proteins, drugs with their ligands, and antibodies with antigens. Thus, the chemical bonded to the probe may be termed the sensing agent, while the chemical recognized on a sample surface may be termed the sensed agent.

In the prior art methods described above, single molecule interaction forces are measured with chemically modified cantilever probe tips in molecular recognition force spectroscopy (MRFS) experiments using so-called force distance cycles: Highly selective ligands (preferentially one per tip) are covalently attached to the tip-end as shown in FIG. 1A. Referring to FIG. 1A, a cantilever probe tip 1 is modified with a specific reagent (such as ethanolamine or aminopropyltriethoxysilane) to place reactive groups (such as amines) on the surface of the probe 2. An amine reactive group 3, attached to one end of a flexible 8-nm long crosslinker 4, tethers the crosslinker (which may be polyethylene glycol (PEG)) to the probe. A second reactive group (for sulfurs in this case, pyridine dithioproprionate (PDP)) 5 reacts with the thiolated surface of the sensing agent, as carried out with the thiolating agent N-succinimidyl 3-(acetylthio) proprionate (SATP) 6, for example.

In this way, the sensing agent, in this case an antibody 7, is held on the end of the crosslinker 4. This arrangement has the advantage that the tethered sensing agent (the antibody 7) is free to move to the extent that the crosslinker 4 is flexible, thereby allowing the sensing agent to align with its target sensed agent (in this case the specific antigen for the antibody) on the surface being probed. Binding of the sensing agent 7 on the tip 1 with a specific sensed agent on the surface can be observed in the force-distance curve obtained as the tip is scanned towards the surface and retracted as shown in FIG. 1B.

The tip 1 is moved towards the surface of a sample, which leads to the formation of a single receptor-ligand bond between the tethered antibody and specific antigen on the sample surface. The force curve on approach shows no sign of this bond formation ("trace" 8). However, on retraction of the tip, a characteristic curve is observed ("retrace" 9) showing an increasing attractive force as the crosslinker 4 is stretched until the bond is broken when the retraced distance equals the almost fully extended length of the crosslinker at 10. The characteristic shape in the retrace reflects the viscoelastic properties of the crosslinker 4 by which the antibody 7 is tethered to the tip 1.

In the prior art described thus far, the surface must be probed by carrying out force-distance curves at every point of potential interest. In Elings et al, U.S. Pat. No. 5,519,212, the patentees state that the interaction between an antibody and an antigen can be detected by changes in the oscillation of a vibrated tip, although there is no description of how this may be accomplished. Raab et al provided the first practical demonstration of antibody-antigen recognition in a scanned image (Raab, Han et al., "Antibody recognition imaging by force microscopy," Nature Biotech. 901–905 (1999)). In this work, a dynamic force microscope was operated in MAC-MODE (a trademark of Molecular Imaging Corp.), a mode in which the tip motion is controlled by an applied magnetic field. This mode of operation is described in greater detail in Lindsay, U.S. Pat. Nos. 5,515,719 and 5,513,518 and in Han, Lindsay et al., "A magnetically-driven oscillating probe microscope for operation in liquids," Appl. Phys. Letts. 69:4111–4114 (1996).

Raab, Han et al. describe that the tip was driven into oscillation with an amplitude similar to the length of the crosslinker (4 in FIG. 1A) used to tether an antibody to the end of the tip. The antibody was antilysozyme and the antigen on the substrate was lysozyme. Referring to FIG. 2A, when a bare tip 21 is used to image the lysozyme 22, images such as those in FIG. 2C are obtained. When a modified tip 23 with antilysozyme 24 is attached (as shown in FIG. 2B), the images of the lysozyme are greatly broadened and increased in apparent height as shown in the image in FIG. 2E. The difference in the appearance of the images is illustrated by the line scans in FIG. 2D. The trace 25 over lysozyme taken with the bare tip 21 is narrower and lower than the trace 26 taken with the antibody tip 23, reflecting the attachment of antibody to antigen and subsequent stretching of the crosslinker as described by Raab, Han et al.

Receptor-ligand recognition is monitored by an enhanced reduction of the oscillation amplitude as a result of antibody-antigen binding. These binding signals are visible as bright and wide dots in the recognition image and reflect the position of ligand binding-sites with nanometer (nm) lateral accuracy. The drawback to this methodology is that the antibody-enzyme binding signals in the recognition image are interfered with by signals owing to the topographic features of the enzyme. Topography and recognition images can only be recorded by comparing a pair of images taken with bare and antibody-conjugated tips, respectively, and are, therefore, not obtained at the same time.

An increase in the speed of molecular recognition imaging is highly desirable, not just for increased effectiveness of microscopy, but also because a rapid molecular recognition method would enable very many small titer wells to be examined for binding affinity, opening a route for rapid drug screening. Accordingly, the need exists in the art to provide an atomic force microscope and method of operation that provides separate yet simultaneous topography and recognition images. A need also exists for a method for the rapid quantitative measurement of molecular binding with high spatial resolution.

SUMMARY OF THE INVENTION

The present invention meets these needs by providing an atomic force microscope and method of operating it that provides separate yet simultaneous topography and recognition images as well as rapid quantitative measurement of molecular interactions with high spatial resolution. The present invention may be useful in providing high spatial resolution of many physical, chemical, and biological interactions on both hard and soft surfaces.

In accordance with one aspect of the present invention, a recognition force microscope for detecting interactions between a probe and a sensed agent on a scanned surface is provided and includes a scanning probe having a tip that is sensitive to a property of a surface, with the probe adapted to oscillate with a low mechanical Q factor. By "Q factor," we mean the quality factor of a cantilever probe, where $Q=f_1/\Delta f_1$, where $f_1$ is the first resonance frequency of the cantilever and $\Delta f_1$ is the full width of the resonance peak at half-maximum. By "low mechanical Q factor" we mean a Q factor of greater than zero and equal to or less than about 20. The Q factor of the cantilever is determined by the stiffness of the cantilever and the viscosity of the medium in which it oscillates, and also, to some extent, by the geometry of the cantilever. A Q factor of about equal to or less than 20 is typical of what might be measured for cantilevers having a stiffness of a few Newtons per meter oscillated in water. This is typical of the conditions used for imaging biological materials with an atomic force microscope (AFM).

The microscope also includes means for recording the displacement of the probe tip as a function of time and means for recording both topographical data and recognition data, i.e., the spatial location of interactions between the probe and sensed agents on the surface. In one embodiment, the means for recording the displacement of the probe tip as a function of time include a source of radiation such as a laser that is directed at the probe, a position sensitive detector that detects radiation reflecting off of the surface of the probe, and a controller that processes the detected radiation. In one embodiment, the means for recording both the topographical and recognition data includes processing circuitry that generates separate topographical and recognition signals. In one embodiment, the amplitudes of the respective upward and downward swings (displacements) of the probe tip are recorded and are used to determine both topographic data and recognition data to identify the spatial location of interaction sites between the probe tip and sensed agents on a sample surface.

Preferably, the probe tip is sensitized with a sensing agent that binds specifically to the sensed agent. In one preferred embodiment of the invention, the sensing agent is an antibody and the sensed agent is an antigen. The sensing agent, such as for example an antibody, may be tethered to the probe tip by a flexible crosslinker (i.e., a chemical agent that binds the sensing agent to the probe tip). Other sensing agent/sensed agent pairs may be utilized. For example, many ligand and receptor pairs are known in the art. Many drugs, toxins, haptens, transmitters, and agonists are known to interact with receptor molecules. Sense and antisense DNA and DNA-RNA proteins also interact. However, the apparatus and methods of the present invention are not limited to molecular binding or bonding but also include other chemical and physical interactions such as, for example, electrostatic charge interactions and hydrophobic/hydrophilic interactions. Thus, the "sensing agent" on the probe tip may include electrical and/or chemical modifications to the tip as well as tethering of molecules to the tip.

In one embodiment, a time varying magnetic field is used to excite the probe into motion using a magnetic material that forms at least a portion of the probe. In a preferred form, the topographic and recognition data signals that are detected and recorded are separated by an electronic circuit that includes means for determining the average value of the displacement of the probe (using a deflection signal generated from the position sensitive detector) on a time scale that is sufficiently long compared to changes caused by topography or binding events such that those events are separately recognized and measured. The electronic circuit also includes means for using the average value of the displacement of the probe to determine the downward amplitude of the probe from the difference between the average value and the value of the downward displacement. In a preferred form, these means include a digital signal processor operating using a recognition-imaging algorithm.

The electronic circuit also includes means for controlling the height of the probe. In a preferred form the means for controlling the height of the probe includes a piezoelectrically driven scanning element in conjunction with a controller. Thus, topography is determined using the downward value of the probe tip displacement. The electronic circuit also includes means for determining the value of the upward displacement of the probe from the measured amplitude and the average value of the displacement to generate a signal corresponding to interactions between a sensing agent and a sensed agent on the surface being scanned. In a preferred form, the means for determining these values includes a digital signal processor operating using a recognition-imaging algorithm.

In another embodiment of the invention, the topographic and recognition signals are separated by an electronic circuit that includes means for digitizing the recorded deflection of the probe tip and computing means for determining the average value of the displacement of the probe tip on a time scale that is sufficiently long compared to changes caused by topography or binding events such that those events are separately recognized and measured. In a preferred form, the digitizing means includes one or more A/D converters. The electronic circuit also includes means for using the average value of the displacement of the probe to determine the downward amplitude from the difference between the average value and the value of downward displacement. In a preferred form, the means for determining these values includes a digital signal processor operating using a recognition-imaging algorithm.

The electronic circuit also includes means for controlling the height of the probe to determine the topography of the sample using the value of downward displacement and means for determining the value of the upward displacement from the upward amplitude and the average value of displacement to generate a signal corresponding to interactions between a sensing agent on the probe tip and a sensed agent on the surface being scanned.

In another embodiment of the invention, the probe tip displacement measured as a function of time is used to determine the spatial location of recognition events by comparison to a predicted or recorded displacement pattern generated for the case when there is no recognition.

The present invention also provides a method of operating an atomic force microscope including scanning a probe oscillating with a low mechanical Q factor and that is sensitive to a property of a surface, recording the displacement of the probe tip as a function of time, and simultaneously recording both topographical images and the spatial location of interactions between the probe and sensed agents on the surface of a sample. Preferably, the method uses the extent of the upward displacement of the probe tip to measure interactions between the probe tip and the sample surface. The height of the probe tip above the sample surface is controlled by using either the extent of the downward displacement of the probe tip (i.e., bottom amplitude), the overall amplitude of the probe tip (i.e., the sum of the upper and lower amplitudes of the tip divided by two), or the average deflection signal (i.e., the difference between the upper and lower amplitudes of the tip).

In another embodiment of the invention, a method for screening reagents for binding to a particular target molecule is provided and includes attaching the target molecule to the tip of a probe, scanning at least one candidate reagent with an oscillated force-sensing probe operating with a low mechanical Q factor, using the extent of the downward displacement of the probe to control the height of the probe above the sample surface, and using the extent of the upward displacement to measure interactions between the target molecule and the candidate reagent. Preferably, the method is used to screen for multiple candidate reagents sequentially. For example, the candidate reagents may be placed in an array and sampled sequentially.

In yet another embodiment of the invention, a method of screening ligands for binding to a particular target on a cell surface is provided and includes attaching the ligand to the tip of a probe, scanning a cell surface with an oscillated force-sensing probe operated with a low mechanical Q factor, using the extent of the downward displacement to control the height of the probe above the sample surface, and using the extent of the upward displacement to measure interactions between at least one target molecule on the cell surface and the candidate ligand.

Accordingly, it is a feature of the present invention to provide an atomic force microscope and method of operating it that provides separate and simultaneous topography and recognition images as well as rapid quantitative measurement of molecular binding with high spatial resolution. This and other features and advantages of the invention will become apparent from the following detailed description, the accompanying drawings, and the appended claims.

BRIEF DESCRIPTION OF THE DRAWINGS

Reference will now be made by way of example to the drawings in which:

Prior art

Prior art FIG. 1A is moved toward and away from a sample surface;

Prior art

FIGS. 4A and 4B illustrate plots of probe tip displacement as the probe tip is scanned across a surface, with FIG. 4A being a plot for a bare tip, and FIG. 4B being a plot for a tip having a sensing agent attached thereto;

FIG. 11 is a schematic illustration of a scanning probe microscope useful in the practice of one or more embodiments of the present invention;

DETAILED DESCRIPTION OF THE PREFERRED EMBODIMENTS

Figure 1A:
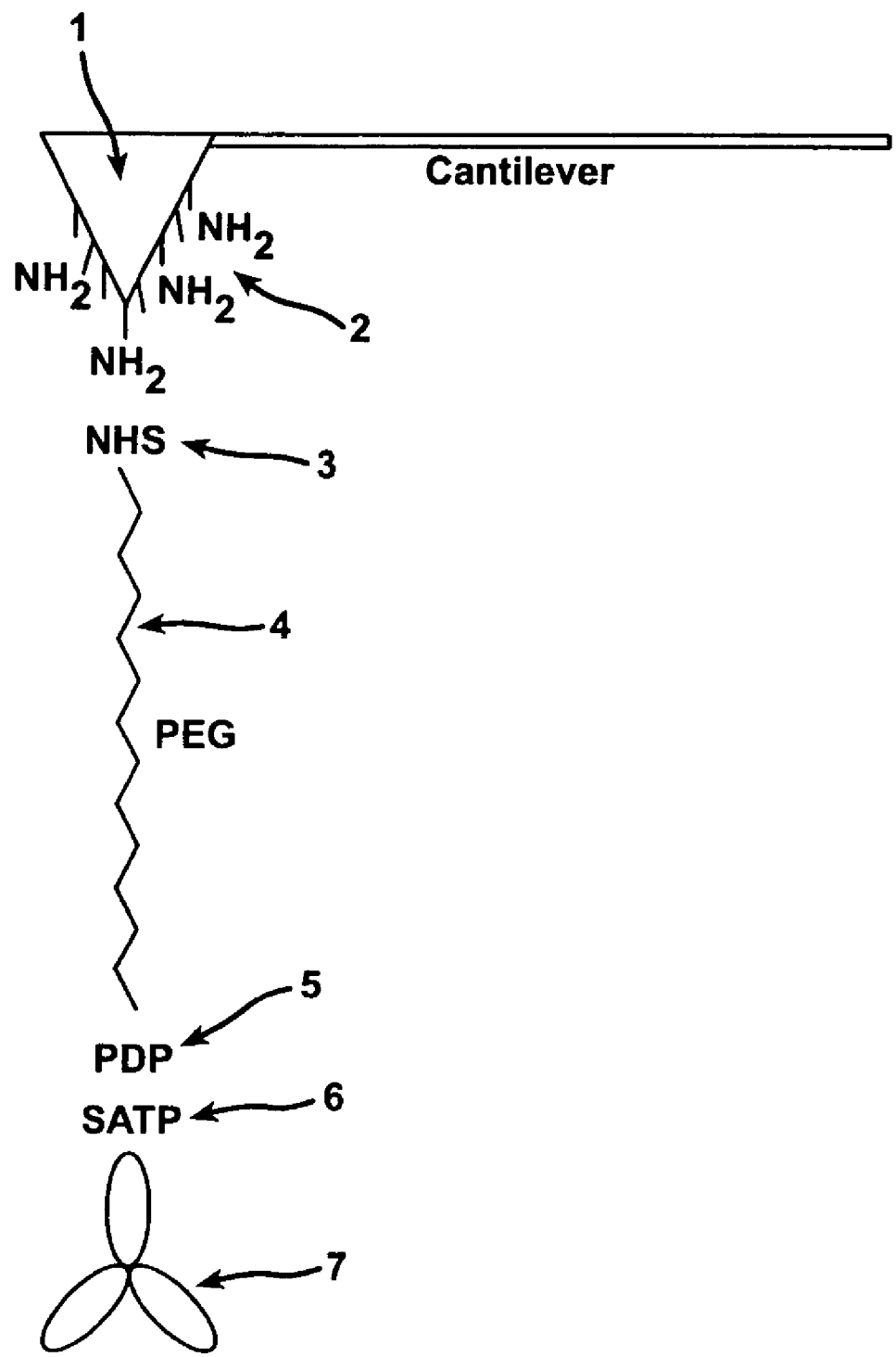
FIG. 1A is a schematic illustration of a chemically-modified cantilever probe tip.
Figure 1B:
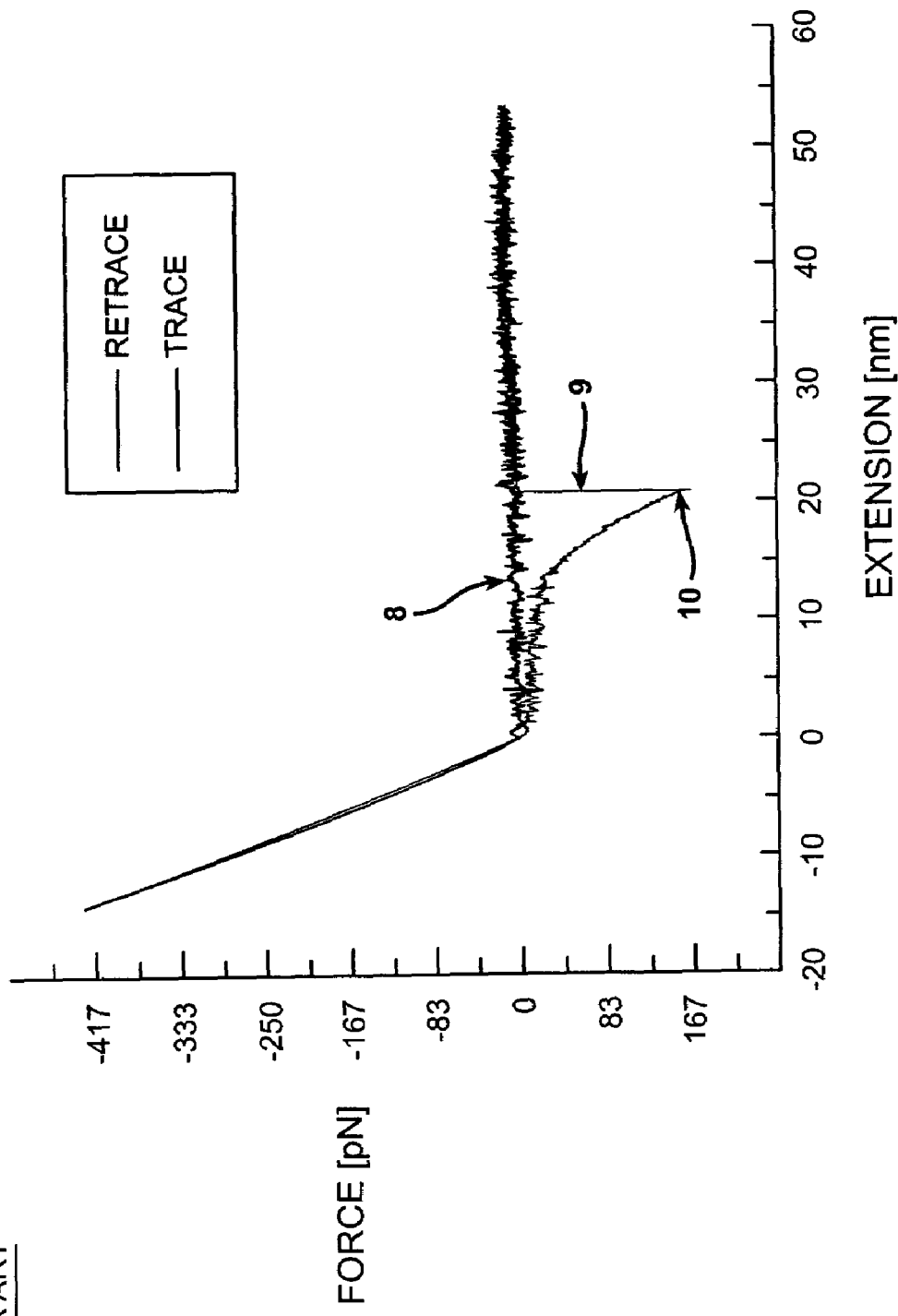
FIG. 1B is a graph of a force versus distance curve showing bond formation and breaking when the chemically-modified cantilever probe tip of prior art

The present invention provides a novel apparatus and method for a molecular force recognition microscopy (MFRM) operational mode that is capable of recording recognition and topography images simultaneously and independently. When an atomic force microscope cantilever with a low mechanical Q factor is oscillated in a fluid, the amplitude at the top of the cantilever swing is not related to the amplitude at the bottom of that swing when the tip intermittently contacts a surface. Such independence is nearly complete for cantilevers operated with a Q factor of greater than zero but less than about 2 to 3, but is still evident to some extent with cantilevers with a Q factor of less than about 20. Cantilevers with low Q-factors (approximately 1 in liquid) that are driven at frequencies below resonance contain recognition and topographic information that are well separated. The time resolved oscillation signals are specially processed before they are fed back into a microscope feedback loop as will be explained in greater detail below.

As shown schematically in FIG. 11, an atomic force microscope (AFM) useful in the practice of the present invention includes a cantilever 28, having a film 29 comprising a magnetic or magnetostrictive material on the top surface thereof. Cantilever 28 includes a probe tip 30 extending from the bottom surface thereof toward sample 32. The probe tip 30 is scanned over the surface 34 of sample 32 by a piezoelectric scanner 36. Deflections of cantilever 28 are detected by directing a focused beam of radiation 38a from, for example, a laser 40 off of the reflective surface of film 29 to form a reflected beam 38b. Position sensitive detector 42 senses the angular position of beam 38b.

A solenoid 64 located in proximity to cantilever 28 is driven by an AC signal from an oscillator 66 as more fully set forth in Lindsay, U.S. Pat. No. 6,121,611, the disclosure of which is hereby incorporated by reference. The resulting alternating magnetic field causes cantilever 28 to oscillate, producing both upward and downward displacement of the probe tip. This oscillating motion appears as an AC signal component in the signal that is detected by position sensitive detector 42. This signal, which includes both upward and downward swing peak values, is fed to a processing circuit 50 that generates both topographic and recognition image signals as will be explained in greater detail below.

Figure 3A:
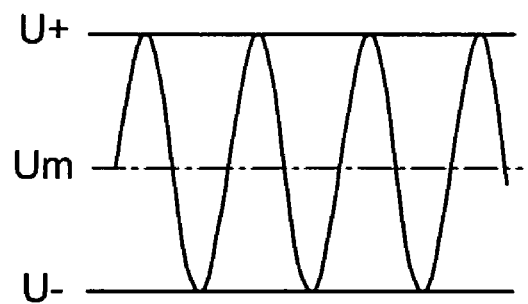
FIGS. 3A–3C illustrate characteristic waveforms for oscillation of a free probe tip (A), a probe tip that contacts a surface (B), and a probe tip that both contacts a surface and becomes bound thereto (C)
Figure 3B:
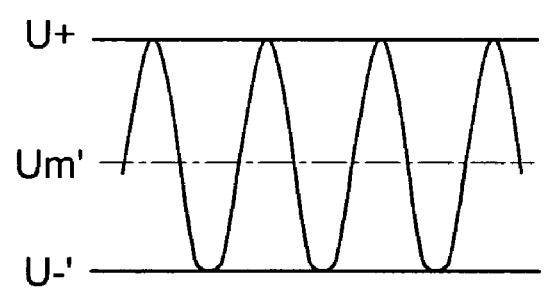
Figure 3C:
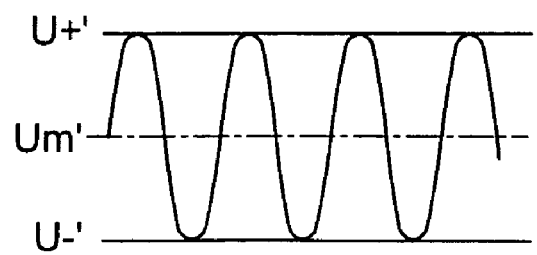

The voltage from the position detector 42 used to sense bending of the AFM cantilever (detector voltage) and is plotted as a function of time for three specific cases in FIG. 3. FIG. 3A shows the signal when the cantilever probe does not contact the surface at any time during an oscillation. The waveform is sinusoidal with a peak displacement value $U_+$ and a lower displacement value $U_-$. The average value, $U_M$, lies half way between $U_+$ and $U_-$. It is not, in general, zero, because the detector signal is DC coupled for preferred embodiments of the microscope of the present invention. When the probe tip contacts the surface (FIG. 3B), the lower amplitude is changed to a different value, $U_-'$. The voltage corresponding to the upper extent of the cantilever swing (displacement), $U_+$, is unchanged. The new average value is $U_M'$ and the new peak-to-peak value is $(U_+-U_-')$. It is this peak-to-peak value (or a proportional quantity, the root mean square value) that is used to control the microscope as topographical images are obtained.

Thus, automatic feedback control through a servo loop in conjunction with the microscope controller acts to maintain the waveform shown in FIG. 3B as the probe is scanned over the surface, with the height changes needed to accomplish this being recorded as the topographical image. For example, as shown in FIG. 11, height error signal 57 is processed by controller 60 that results in a Z height correction signal being sent through high voltage amplifier 62 to piezoelectric scanner 36. If the servo control of height were to be released as the probe encountered a binding site (on an otherwise flat surface), the waveform shown in FIG. 3C would be obtained. Because the surface was assumed to be flat, $U_-'$ continues at its previous value.

However, if the overall amplitude of the oscillation is comparable to the crosslinker length (4 in FIG. 1A), then the amplitude of the upward swing is reduced if the tethered sensing agent binds a sensed agent on the surface. Thus, the positive peak voltage is changed to a new value, $U_+'$. Thus, changes in $U_+'$ relative to a baseline signal before binding, $U_M'$, reflect interactions between the sensing agent on the tip and the sensed agent on the surface, but not the surface topography if the cantilever Q is low enough, i.e., less than about 20, and preferably less than about 3. Correspondingly, changes in the lower voltage, $U_-'$ relative to $U_M'$, reflect the topography, but not interactions between the sensing agent and the sensed agent.

This sensitivity is illustrated, by way of example, in recordings of the deflection of the oscillating tip as it is scanned over a line across a surface covered with sparsely distributed single distributed enzyme molecules that are specific antigens for antilysozyme on the probe. To illustrate the effect, scans were made with the servo control of height switched off. The results are shown in FIG. 4.

Figure 2B:
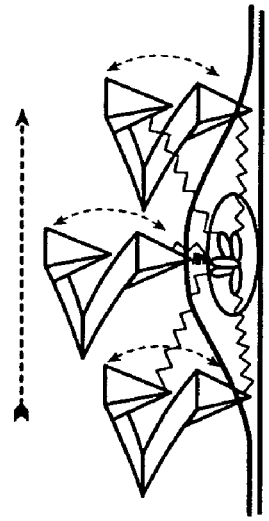
FIG. 2B is a schematic illustration of a chemically-modified probe tip interacting with a lysozyme that produces an image as shown in prior art prior art FIG. 2E; prior art FIG. 2D provides a comparison of the height and width of images produced by the probe tips illustrated in prior art FIGS. 2A and 2B.
Figure 2E:
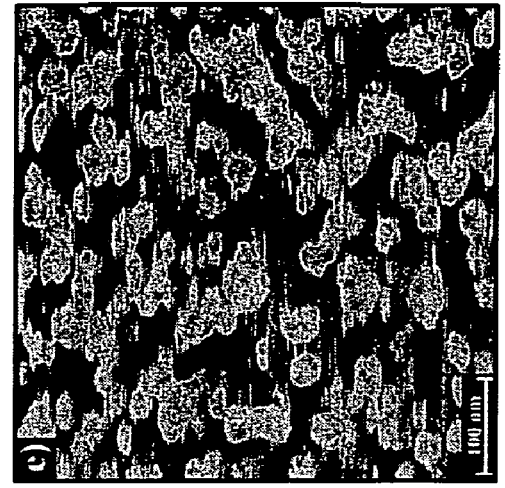
FIG. 2A is a schematic illustration of an unmodified probe tip interacting with a lysozyme that produces an image as shown in prior art FIG. 2C; prior art
Figure 2D:
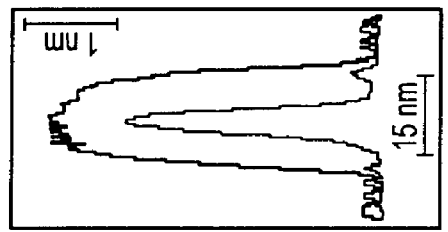
Figure 2A:
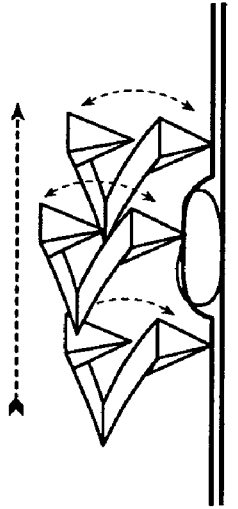
Figure 4A:
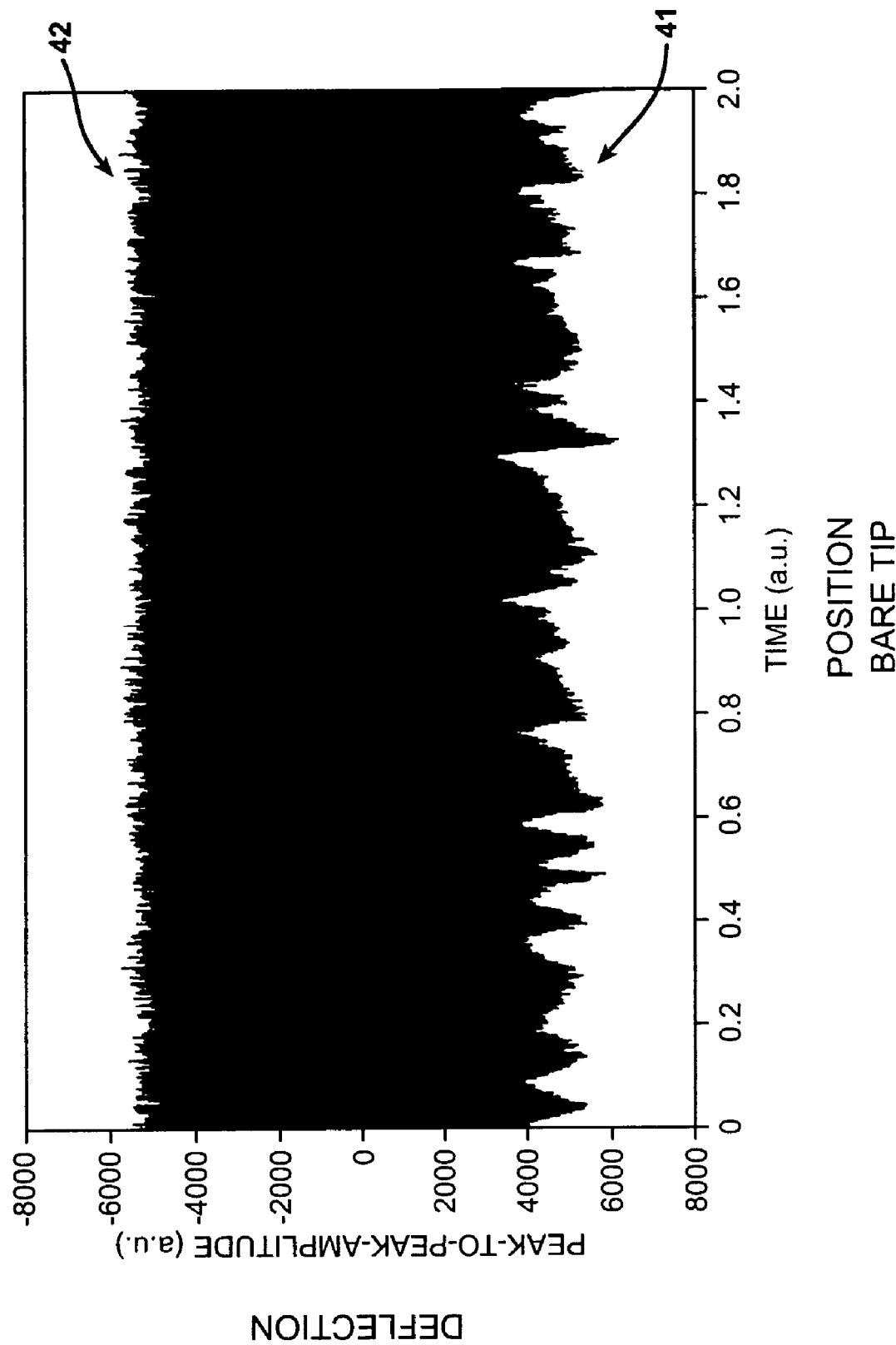

Scanned with a bare tip (no tethered antibody, e.g. 21 in FIG. 2A), the deflection signal recorded as the probe tip is scanned in a sweep across the sample is shown in FIG. 4A. Because the microscope servo loop is disabled, the lower amplitude ($U_-'$, 41) fluctuates as the probe scans over enzymes on an otherwise flat surface. However, because the tip has a low mechanical Q factor, the upper amplitude, $U_+'$ 42 remains unaffected. When, however, an antibody functionalized probe tip is scanned over the same surface (FIG. 4B) both $U_-'$ (43) and $U_+'$ (44) fluctuate.

The data in FIG. 4 are presented in compressed form (20,000 full periods of oscillation shown in total) so that only the minima (lower border line of envelope) and maxima (upper border line of envelope) of the respective oscillation periods are visible. The surface contact only influences the downward deflections (minima) of the oscillations. Therefore, enzymes on the surface are solely detected by the oscillation minima (bumps in the lower line of the envelope) and the maxima remain constant within the thermal noise of the cantilever deflection.

If, however, the same sample is scanned with an antibody-containing tip, bumps are also visible in the upper borderline 44 (FIG. 4B). Binding of the antibody on the tip to the enzyme on the surface reduces the upward deflection, because the tip is physically connected to the surface via the flexible crosslinker (4, FIG. 1A). The tip oscillation amplitude is ideally chosen to be just slightly smaller than the extended crosslinker length, so that both the antibody remains bound while passing a binding site and the reduction of the upward deflection is of sufficient significance compared to the thermal noise to be measured. Because the spring constant of the crosslinker is nonlinearly increasing with the tip-surface distance, the binding force is only sensed close to full extension of the crosslinker (given at the maxima of the oscillation period). Therefore, the recognition signals are well separated from the topographical signals arising from the surface, both in space (Δz of approximately 5 nanometer) and time (half oscillation period of approximately 0.1 millisecond).

There are a number of possible ways to implement the practice of the present invention, and those skilled in this art will recognize that the invention is not limited to the specific electrical circuitry described herein. In one embodiment of the present invention, topography and recognition images are obtained simultaneously using circuit 50 illustrated in FIG. 5. The signal from the detector 42 is passed to a peak detector 52 and maxima ($U_+$) and minima ($U_-$) of each sinusoidal cantilever deflection period are detected, filtered, and amplified. DC offset signals 53 and 54 are used to compensate for thermal drifts. The signals are chosen so as to be close to $U_M{}'$, but adjusted during the scan as needed to compensate for slow drifts in $U_M{}'$. Values for $U_+$ and $U_-$ are fed into the AFM controller 56 with $U_-$ driving the feedback loop 55 to record a height (topography) image 57 in a normal manner and $U_+$ providing the data for constructing a recognition image 58 by displaying $U_+$ as a function of position on the surface. In this way, topography and recognition images are obtained both simultaneously and independently.

Figure 2C:
Figure 5:
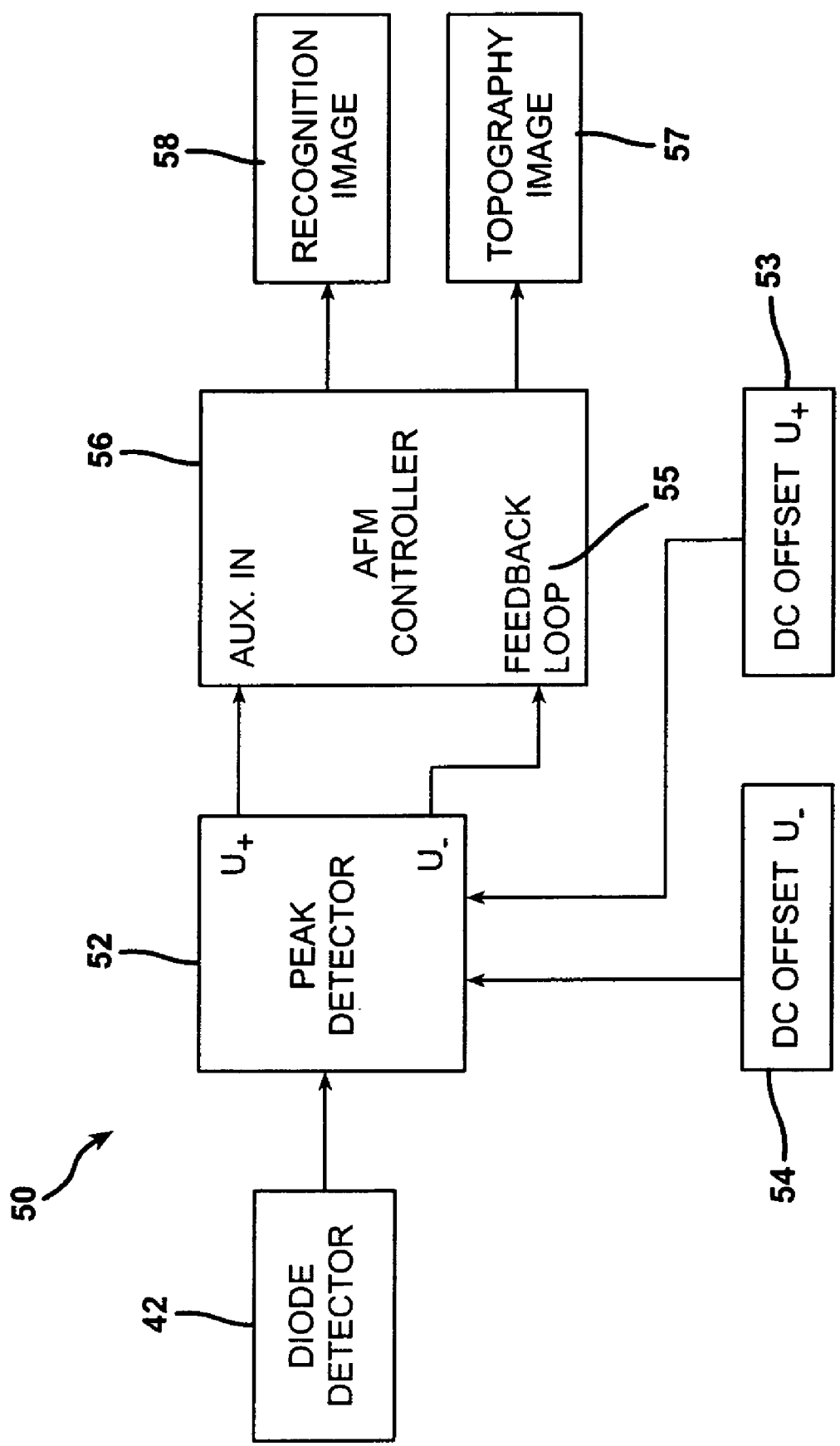
FIG. 5 is a schematic illustration of one embodiment of an electronic circuit that separates topography and recognition signals.
Figure 6A:
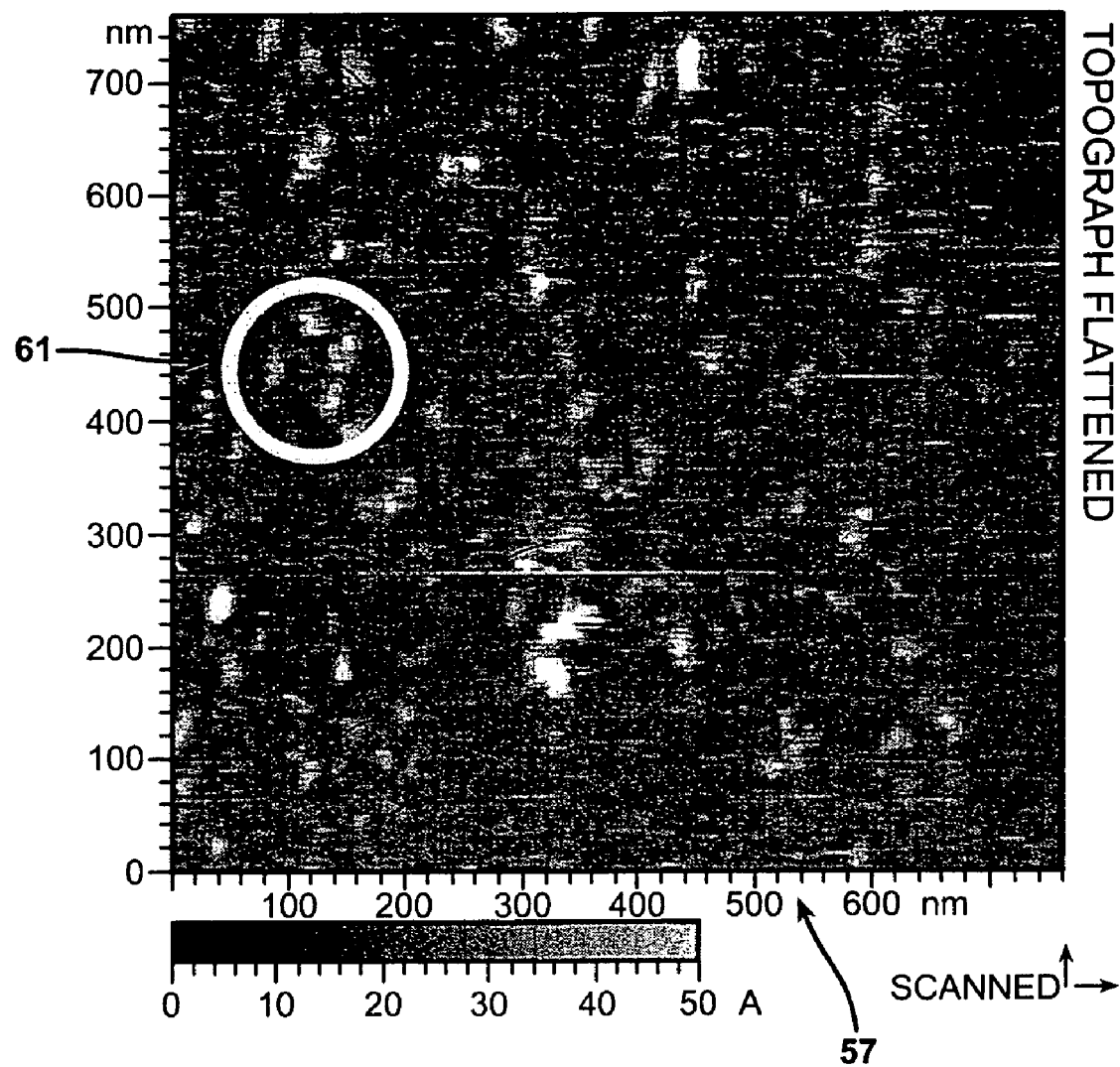
FIGS. 6A and 6B are simultaneous topography and recognition images, respectively, that are produced when a probe tip having a sensing agent tethered thereto is used to image a surface containing sensed agents.
Figure 6B:
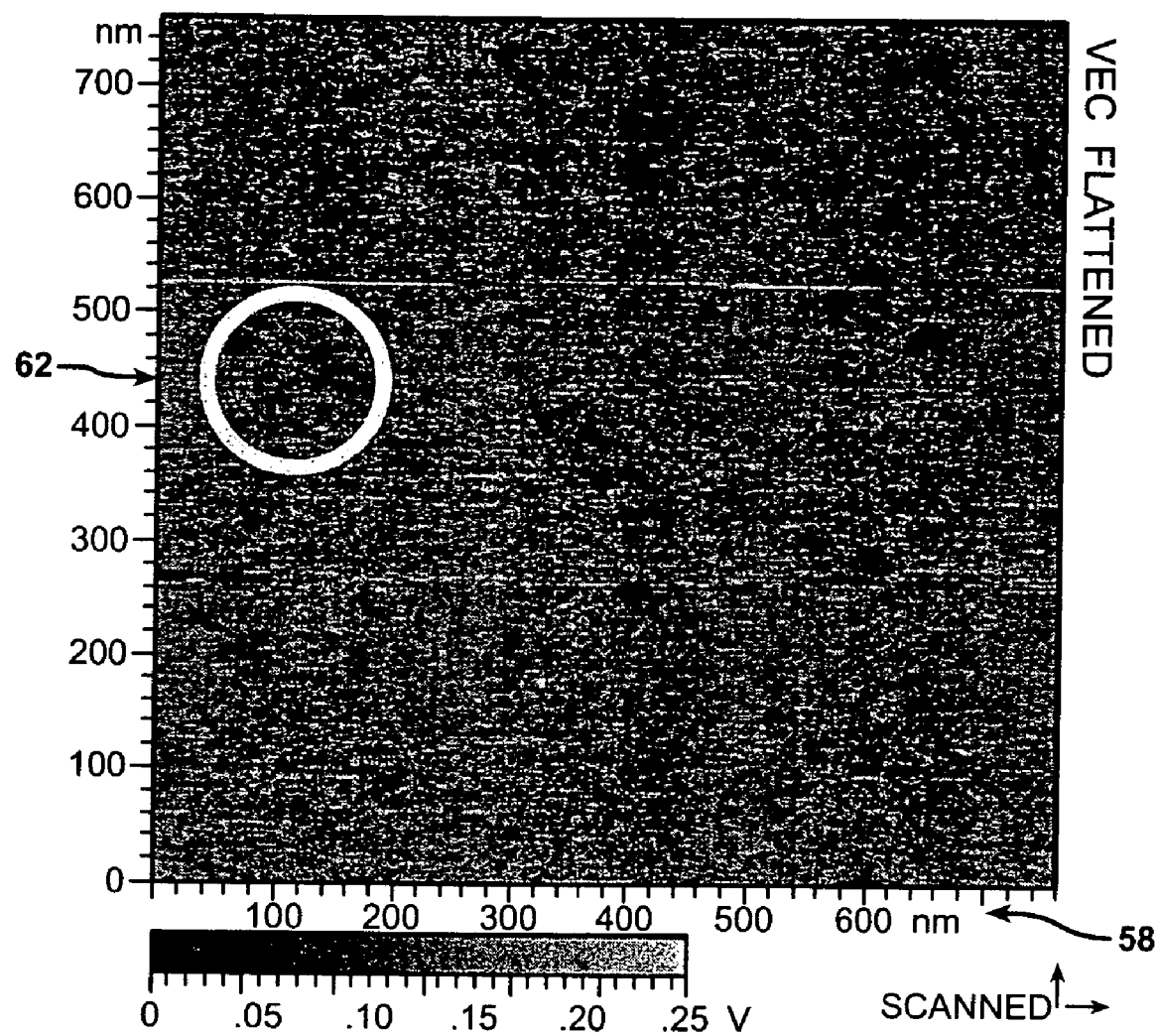

Results of the operation of the circuit of FIG. 5 with a tethered antibody are shown in FIG. 6. The topography image 57 is shown in FIG. 6A, and it shows many enzymes located on the surface with dimensions similar to those obtained in images that use the peak-to-peak amplitude as the control parameter (e.g., FIG. 2C). The image in FIG. 6A was obtained with a tethered antibody. The recognition image 58 is shown in FIG. 6B. Dark spots are seen for some of the molecules, corresponding to a dip in $U_+$ as antibody and antigen bind. For a given cluster of molecules 61 only a fraction show simultaneous recognition imaging events 62. However, the lateral positions of enzymes recorded in the topography are spatially correlated with the recognition signals of the recognition image.

Figure 7A:
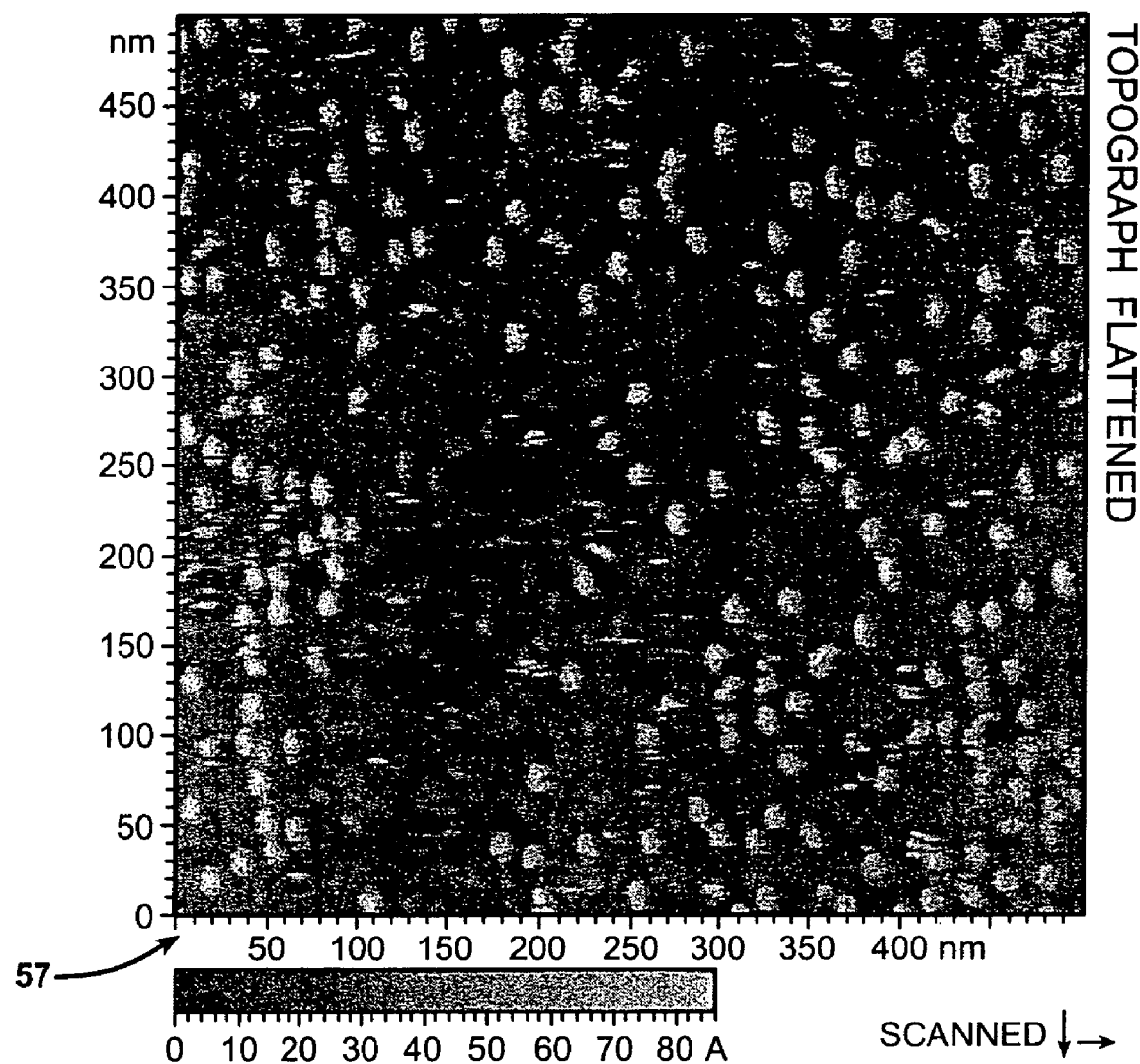
FIGS. 7A and 7B are simultaneous topography and adhesion images, respectively, that are produced when a bare probe tip is used to image a surface containing sensed agents.
Figure 7B:
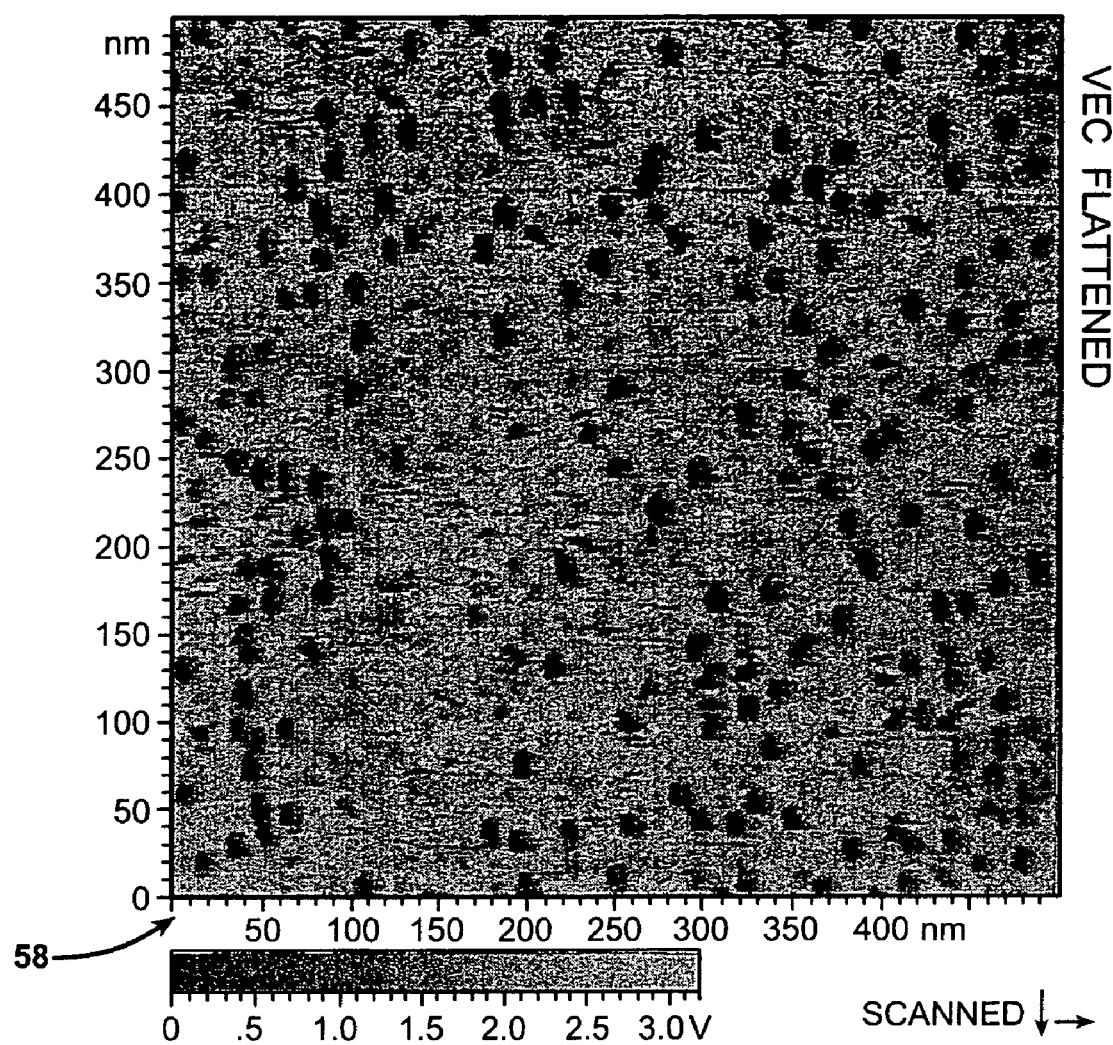

This method of one embodiment of the present invention works even in cases where a flexible tether is not used, and this is illustrated by recognition images of ferritin, a highly positively charged protein. It was sensed with a negatively charged AFM cantilever probe tip (but which was not specifically chemically modified, in contrast to the examples described previously). When the AFM tip touches a ferritin molecule tip-protein adhesion due to electrostatic attraction leads to decrease of the upward deflection. An almost perfect match between positions of proteins in the topography image 57 (FIG. 7A) and localization of charge interaction in the adhesion image 58 (FIG. 7B) is visible. In this case, the amplitude of oscillation is chosen to be so low that the tip is never completely free from the protein on the upward swing, despite the lack of a flexible crosslinker.

The method of one embodiment of the invention is sensitive to chemical adhesion between the probe and the surface even in the absence of a tether. This is because the upper swing of the cantilever is damped to some extent by events that dissipate energy on the lower swing of the cantilever (because the Q is on the order of 1 or a little more). Thus, local points of high adhesion lead to reduction in the amplitude of the lower swing. The overall damping (both upper and lower parts of the swing) leads to an apparent high point in the topography as the controller pulls the tip away from the substrate to restore the oscillation amplitude. By monitoring the recognition signal simultaneously with the topography signal, embodiments of the present invention permit discrimination between topographical features that are real (i.e., caused by a real change of height) and those that are a consequence of local changes in adhesion (i.e., change in surface chemistry with no change of height).

These alternative modes of operation demonstrates that the described embodiments of the present invention have a broad range of applications as a high resolution sensing apparatus for the correlation between topographic structures and localization of specific interaction in general. However, the embodiments described above operate best for flat surfaces and when the drift of the instrument is not too large. This is because the average DC value of the raw displacement signal does vary even when the peak-to-peak amplitude is under servo control as a result of drift and errors in the servo when rough terrain is scanned.

Figure 8:
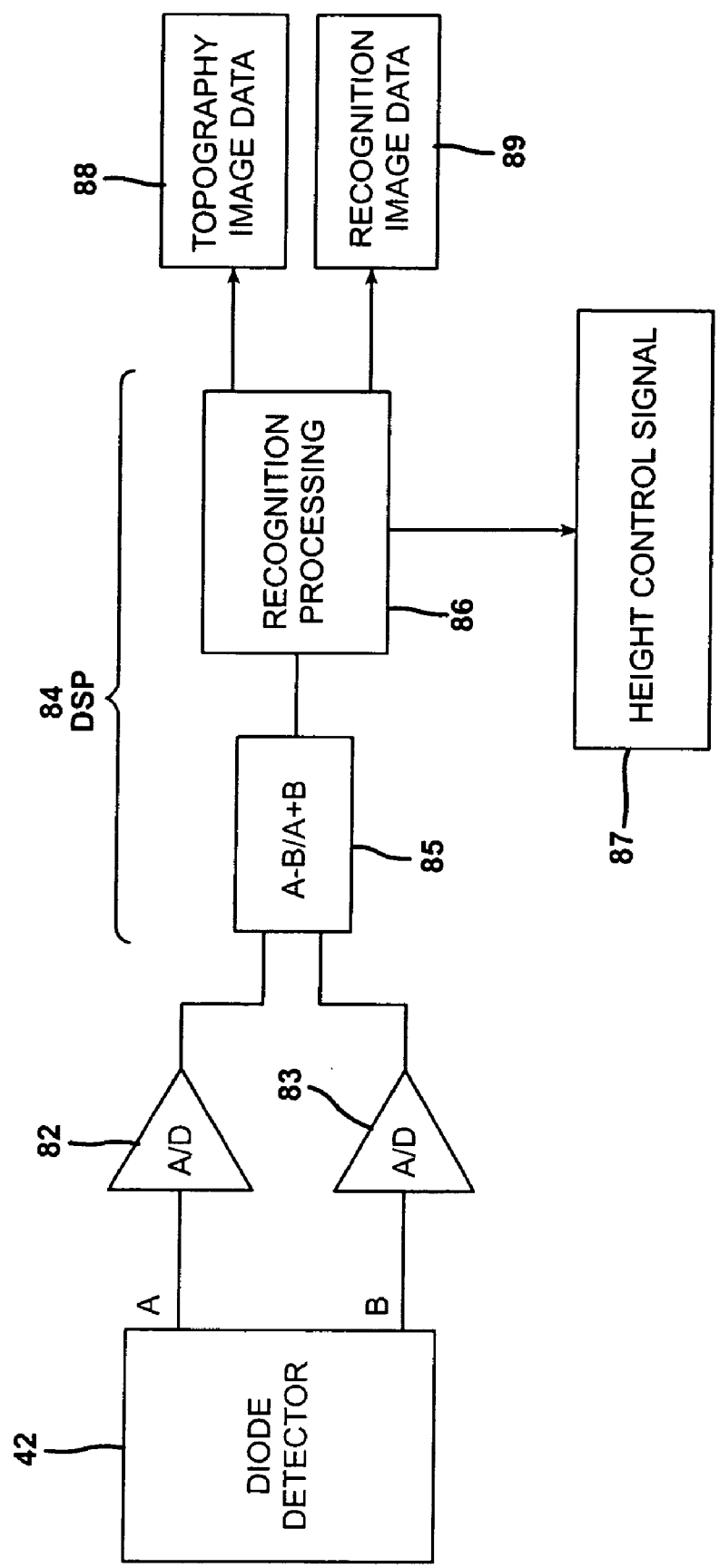
FIG. 8 is a schematic illustration of a digital electronic circuit for one embodiment of the invention that separates topography and recognition images.

These disadvantages are overcome in another embodiment of the present invention that is shown schematically in FIG. 8. The raw signals (A and B represent the signals from the upper and lower segments of the photodetector, respectively, from the diode detector 42 segments) are DC coupled into analog to digital converters 82 and 83 and fed to a digital signal processor 84 where the deflection signal is formed by calculating the difference of the segment voltages divided by their sum as shown at 85. The height control signal 87, topography image data stream 88 and a subsequent algorithm 86, further described below, obtains recognition image data stream 89. Alternatively, the deflection waveform could be obtained by analog methods and then converted to a digital form for subsequent processing.

Figure 9:
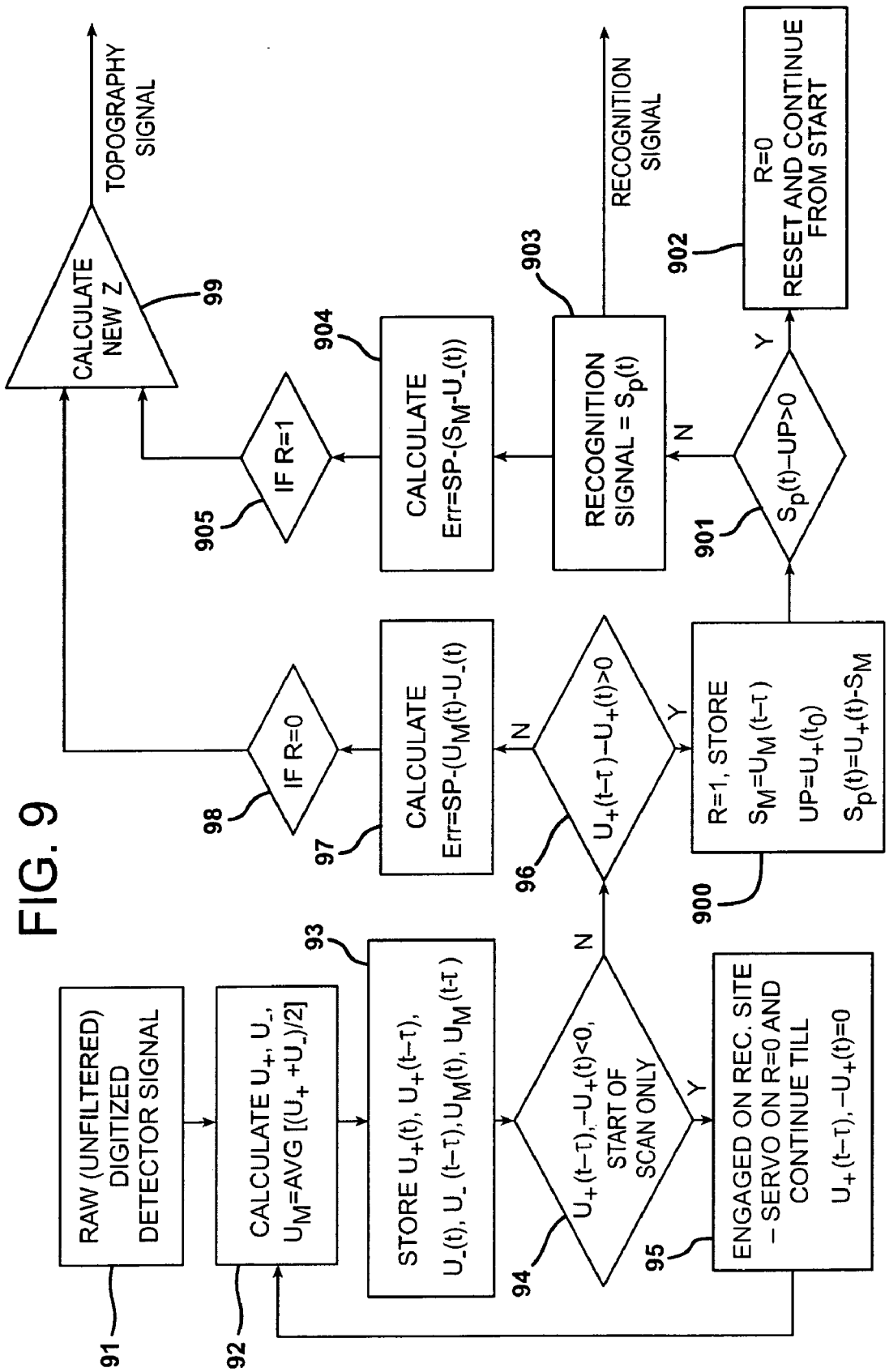
FIG. 9 is a flow chart depicting an algorithm used in one embodiment of the invention for recognition imaging.

The recognition-imaging algorithm 86 is described by the flowchart in FIG. 9. In a first step 92, the following quantities are calculated in DSP 84 (FIG. 8) using the digitized detector waveform 91 obtained as described above:

$U_+$, the sliding average peak positive value of the deflection signal where the signal is polarized so that positive voltages correspond to upward swings of the cantilever. The time period of the sliding average is $\tau$.

$U_-$, the lowest sliding time average value of the deflection signal. The time period of the sliding average is $\tau$.

$U_M$, the mean averaged value of voltage, given by a sliding time average of $(U_+-U_-)/2$. The time period of this sliding average is $T>\tau$.

$\tau$ is chosen to permit a rapid response of the servo while minimizing noise. For example, if one line scan of 512 pixels is accumulated in 1 second, then $\tau=1/512s=0.0195$ seconds. A tip vibration frequency of 5 kHz, then results in $0.0195/0.0002=10$ cycles averaged for each value of $U_+$ and $U_-$. T is chosen so as to give a static value for $U_M$ in the absence of recognition events. Because the servo feedback control loop maintains $U_-$, then, in the absence of recognition events, $U_M$ should be a constant. However, mechanical and thermal drifts cause the average position of the probe to change slowly. Therefore, $U_M$ must be averaged over a period that is small compared to the total scan tine for an image, but larger than the time spent by the probe when it is engaged in a recognition event. A suitable time is about $\frac{1}{20}^{th}$ of a line scan time, or 0.05 seconds in this case. This time may be user-adjustable, being shortened when the image area contains a high density of binding sites.

The values of $U_-(t)$ and $U_+(t)$ are stored each $\tau$ seconds in temporary memory locations 93 where the two previous values $U_-(t-\tau)$ and $U_+(t-\tau)$ are also stored. $U_M(t)$ is updated every T seconds (calculated as a sliding average over T seconds) and the current value $U_M(t)$ and the prior value, $U_M(t-\tau)$, stored as well. The quantity $U_+(t-\tau)-U_+(t)$ is formed only when a scan is first started (94). If this quantity is less than zero (so that the upper voltage is rising with time), the scan was started on a recognition site. In this case, the microscope servo is engaged using the R=0 pathway (97, 98) and the scan continued until $U_+$ reaches a stable value ($U_+(t-\tau)-U_+(t) \geq 0$) after which the signal is subsequently tested for $U_+(t-\tau)-U_+(t)>0$ (96). If the signal falls ($U_+(t-\tau)-U_+(t)>0$), then a recognition event has occurred and control branches to 900. If not, an error signal is calculated from the difference of a set point value (user controlled), SP and $U_M(t)-U_-(t)$, the downward value of the deflection. This is used to control the height of the probe in a conventional manner and thus to determine the sample topography (and height control signal) via the usual feedback circuit 99 as is well known in the art. This feedback path applies only if no recognition event is in progress. In this case the flag R is zero so the $U_M(t)-U_-(t)$ signal is connected to the servo via the switch 98.

When $U_+(t-\tau)-U_+(t)>0$ occurs, flagging a recognition event, the recognition flag is set to R=1, the value of the mean signal is set to the value just prior to recognition, i.e., $S_M=U_M(t-\tau)$ so that $S_M$ is not updated like $U_M$ but corresponds to the value of $U_M$ just prior to recognition. The value of the peak amplitude just at recognition is stored as $UP=U_+(t_0)$, where $t_0$ represents the start time. Finally, a new peak positive value, $S_p$, is calculated using $S_M$ according to $S_p(t)=U_+(t)-S_M$ as shown in 900. While the upper amplitude remains below the value at the onset of sensing ($S_p(t)-UP<0$) control continues in the recognition mode (901). $S_p(t)$ is recorded in a separate image buffer to generate a recognition display like those shown in FIGS. 6B and 7B. The height servo is now controlled from the signal $SP-(S_M-U-(t))$ at 904 and passed on to the servo 99 via the switch 905. When the upper amplitude reaches its value at the start of recognition, $S_p(t)-UP>0$, the control mode returns to normal (R=0) at 902 and $U_M$ is calculated as a sliding average again starting from the stored value $S_M$.

It will be recognized that other algorithms may be devised to accomplish the same results. For example, the servo feedback control can be continued on one path only, using $U_M$, so long as T is much greater than the time spent in a recognition event. This would result in some error in the topography signal, but it would correctly identify recognition events.

Figure 10:
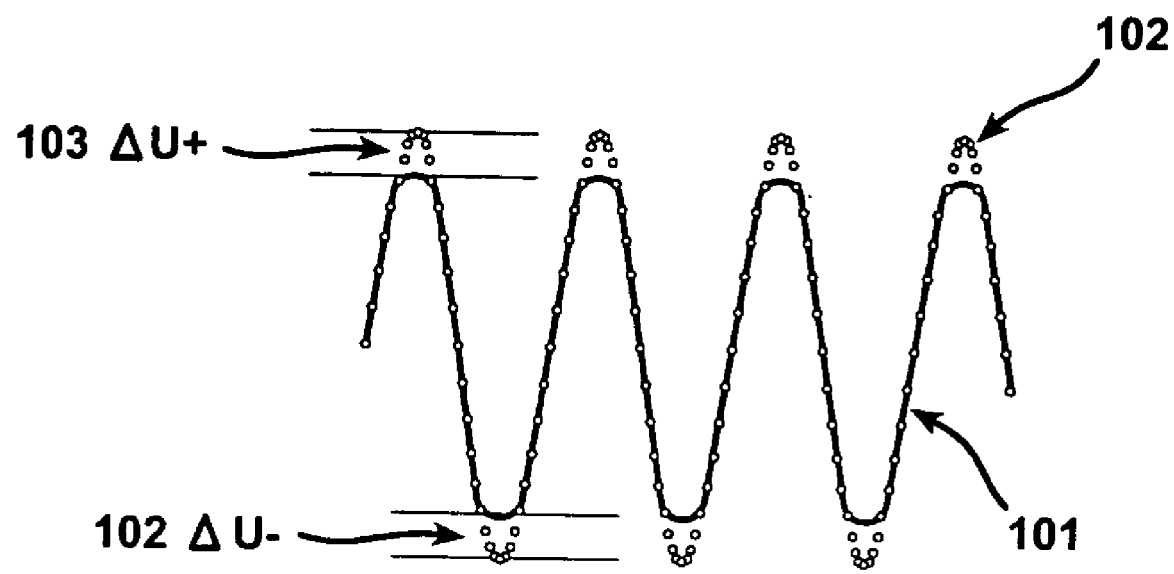
FIG. 10 is an illustration of recognition and topography signals obtained from distortion of a probe tip oscillation waveform.

Another, more computationally intensive, but faster method is to compare each cycle of the oscillation amplitude to a best fit sine wave as illustrated in FIG. 10. Here the solid line shows the instantaneous value of the displacement data stream 101, while the dots correspond to the best-fit sine wave 102. The peak difference between the upper value of the data and the upper part of the fit ($\Delta U_+$) at 103 gives the amplitude decrease owing to recognition binding and can be plotted as the recognition signal. The peak difference between the lower value of the data and the lower part of the fit ($\Delta U_-$) at 104 gives the amplitude decrease owing to topography and can be used to control the height servo loop.

In another embodiment of the invention, as shown in FIGS. 12A–12C and 13, the microscope is operated in the normal manner to generate topographic signals. An included circuit in the microscope views changes in the upper portion of the raw deflection signal as a function of time to provide spatial recognition of binding events and a recognition image simultaneously with topographic signals.

Figure 12A:
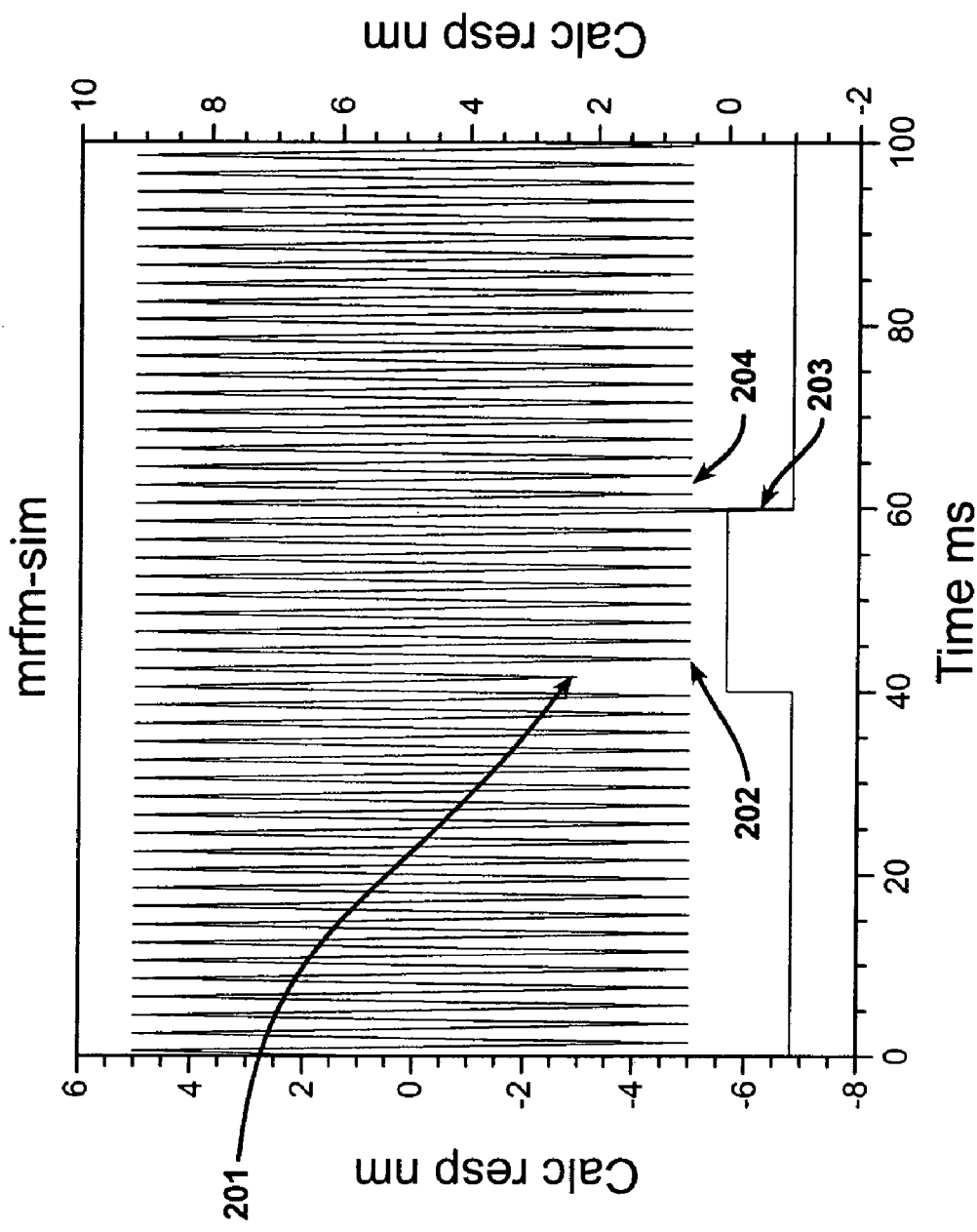
FIGS. 12A–12C are charts depicting a raw deflection signal from a surface scan having upper and lower peaks, with FIG. 12A depicting a probe tip encountering a change in surface topography, FIG. 12B depicting a deflection event as a functionalized probe tip encounters and binds with a sensed agent on a surface, and FIG. 12C depicting the absolute value of the peak and peak differential signals derived from FIG. 12B.

Referring now to FIGS. 12A–12C and 13, the servo feedback control loop is operated from the AC coupled deflection signal in a normal manner to provide the best image. By way of example, it is assumed that the microscope is engaged with ±5 nm amplitude when in contact with the surface (greater than this before engagement). FIG. 12A shows the raw deflection signal as a 1 nm high object spanning 40 to 60 ms on the time axis is scanned. At 201 the surface diminishes the lower extent of the cantilever probe swing. At 202 the servo control activates, pulls the sample away from the probe tip, and restores the full amplitude of the oscillating probe. At 203 the surface of the scanned object falls away, increasing the lower amplitude of the oscillation. At 204 the servo control again activates and pushes the sample toward the probe tip again to reach the engage amplitude.

Figure 12B:
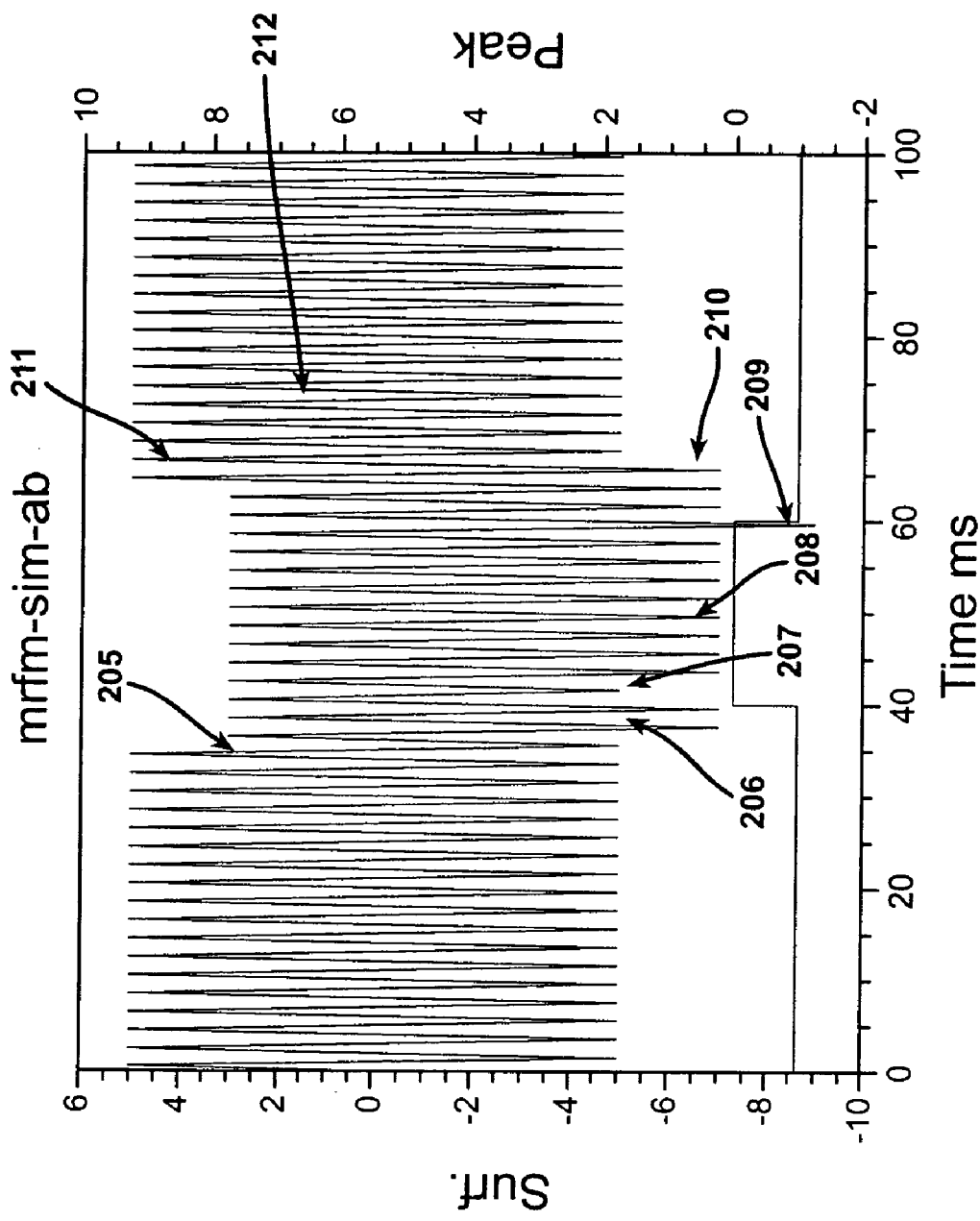

By way of example, FIG. 12B shows the sequence of events as an antibody tip functionalized with a tethered antibody on a 3 nm tether passes over an antigenic object on a scanned surface spanning 40 to 60 ms in the time axis. At 205 the antibody binds, causing the peak amplitude on the top swing of the probe to reduce. At 206, the servo control activates and pulls the sample away from the probe tip. This causes the negative peak amplitude to become more negative. The apparent displacement recorded in FIG. 12B has nothing to do with translation of the sample, an event that causes negligible bending change in the cantilever. Rather, the amplitude loss comes from the top portion of the swing, but the servo control restores the bottom portion to its previous negative amplitude. At 207 the probe tip encounters the sample, reducing the lower swing amplitude. At 208, the servo control activates again, pulling the sample further away from the probe tip. At 209, the probe tip reaches the edge of the object, increasing the lower amplitude of the deflection signal. At 210 the servo control activates again and pushing the sample toward the probe tip to restore the lower amplitude. At 211 the antibody unbinds from the probe tip, and at 212 the servo control acts to pull the sample away from the probe tip to compensate.

Figure 12C:
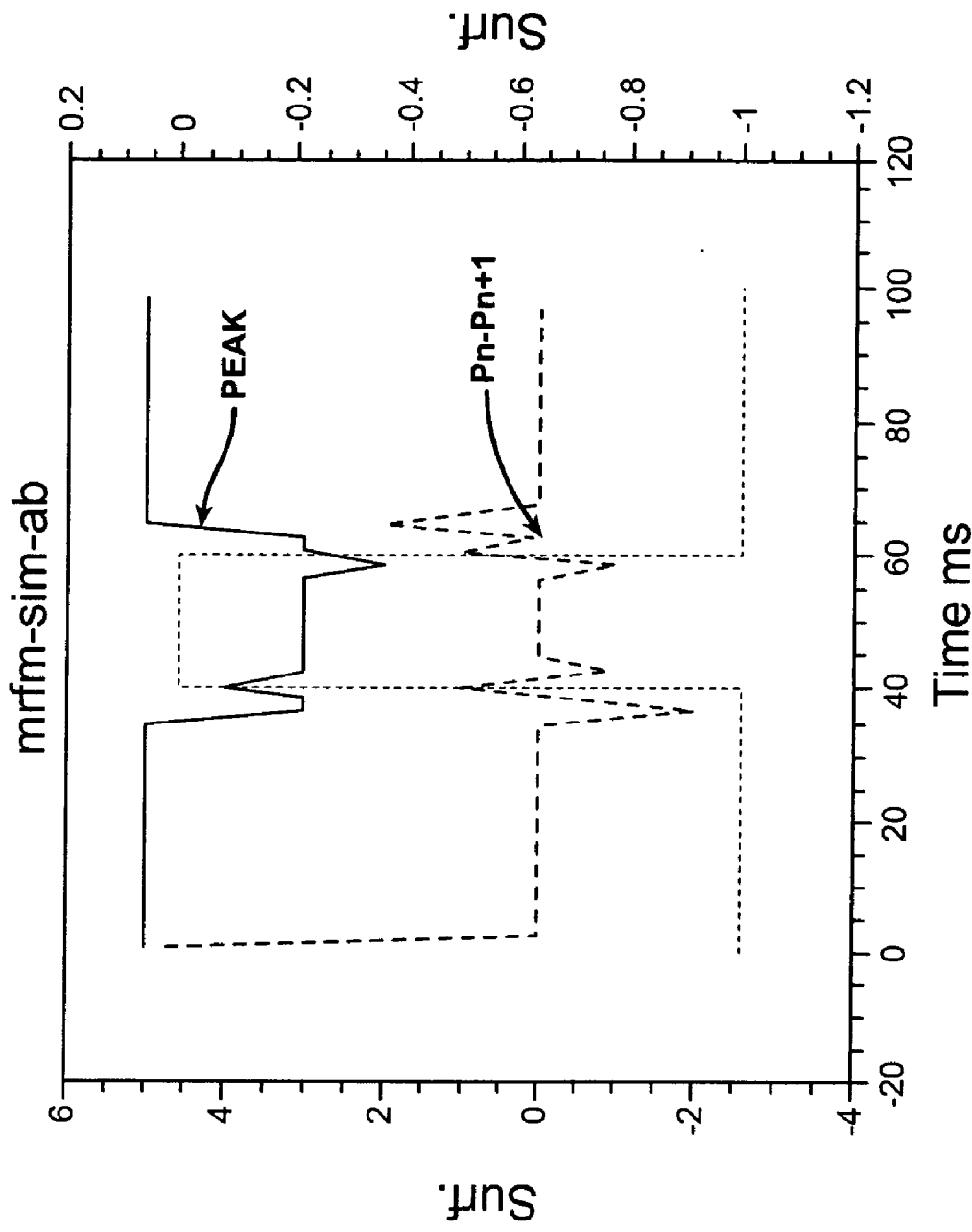

FIG. 12C shows the absolute value of the peak amplitude. It is depressed when the probe is over the antigen on the scanned surface, but has spikes in it where the servo control is reacting. The peak signal provides useful recognition of the binding and unbinding events. However, the signal should be corrected for drift. One way to correct for drift (given a real time signal) is to take the real time point-to-point derivative of the peak signal, shown as the dashed line in FIG. 12C. This signal is predominantly negative as the object (e.g., antigen) first binds, is zero, and then becomes predominantly positive. Thus, an image formed from this signal would show the binding event as ringed by a black ring on the approaching perimeter and a white ring on the receding perimeter.

Figure 13:
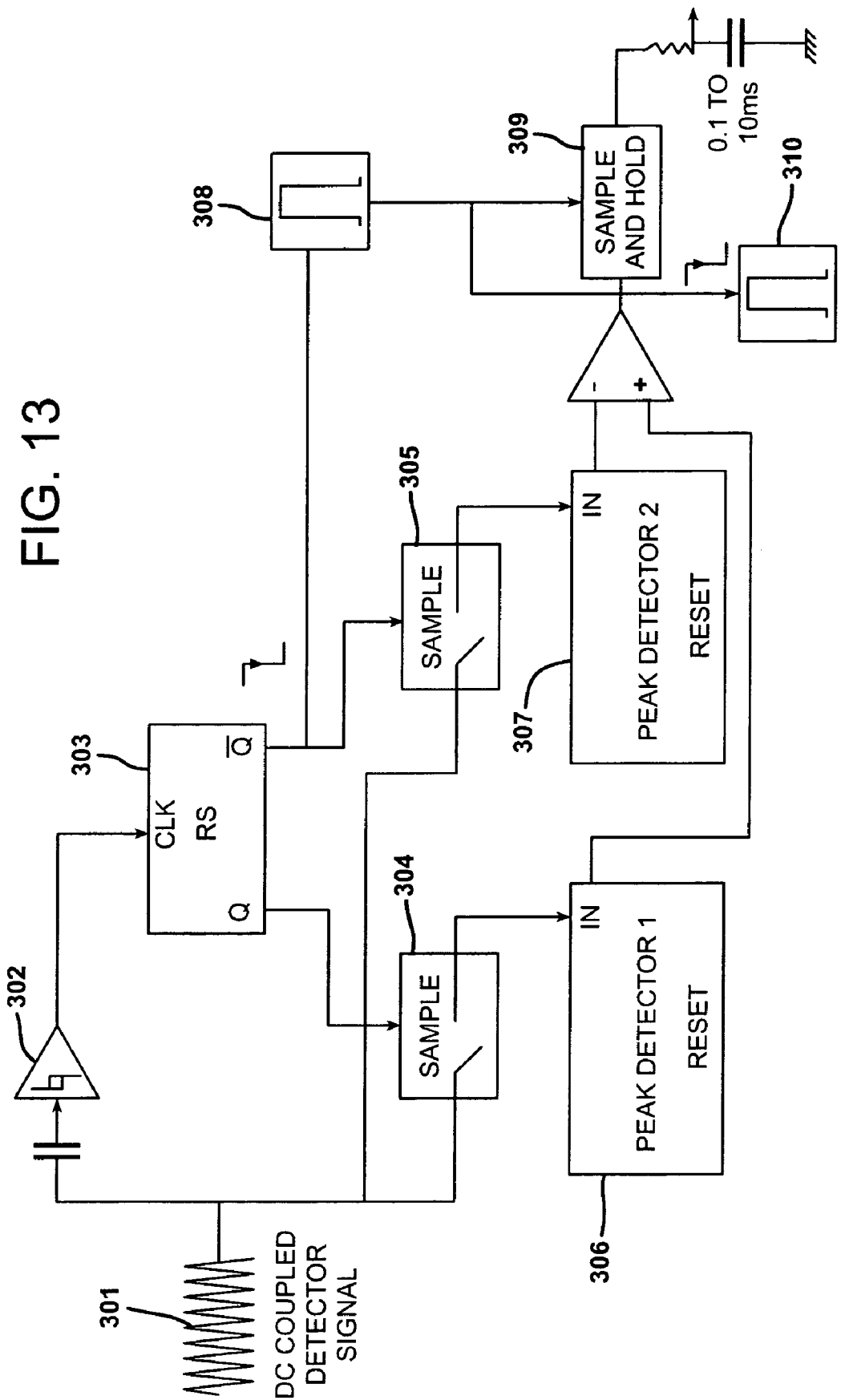
FIG. 13 is a schematic illustration of an embodiment of a peak differential detector that provides a recognition signal.

An embodiment of a detector circuit implementing the above detection scheme is shown in FIG. 13. Referring to FIG. 13, the DC coupled deflection signal 301 is fed into a square wave generator 302 comprising an AC coupling and a Schmidt trigger. This generates a digital clock 303 synchronized to the deflection signal. The RS (resevset) flip flop divides the result by two as shown. The outputs of the flip-flop, Q and $\overline{Q}$, drive analog switches 304, 305 in series with two peak detectors 306, 307, respectively, so that the peak positive value on alternate cycles is held on the two peak detectors. The falling edge of the $\overline{Q}$ output generates a short delay pulse 308 (small compared to a cycle) and operates the sample and hold 309 to store the difference between the peak values, $P_{n+1}-P_n$. A second delay pulse 310 resets the peak detectors. An RC time constant is used to provide signal averaging. It should be user switchable and cover from a single cycle to a few cycles so that servo-related discontinuities are smoothed (e.g., a time constant from 0.1 to 10 ms in 5 steps).

Figure 14:
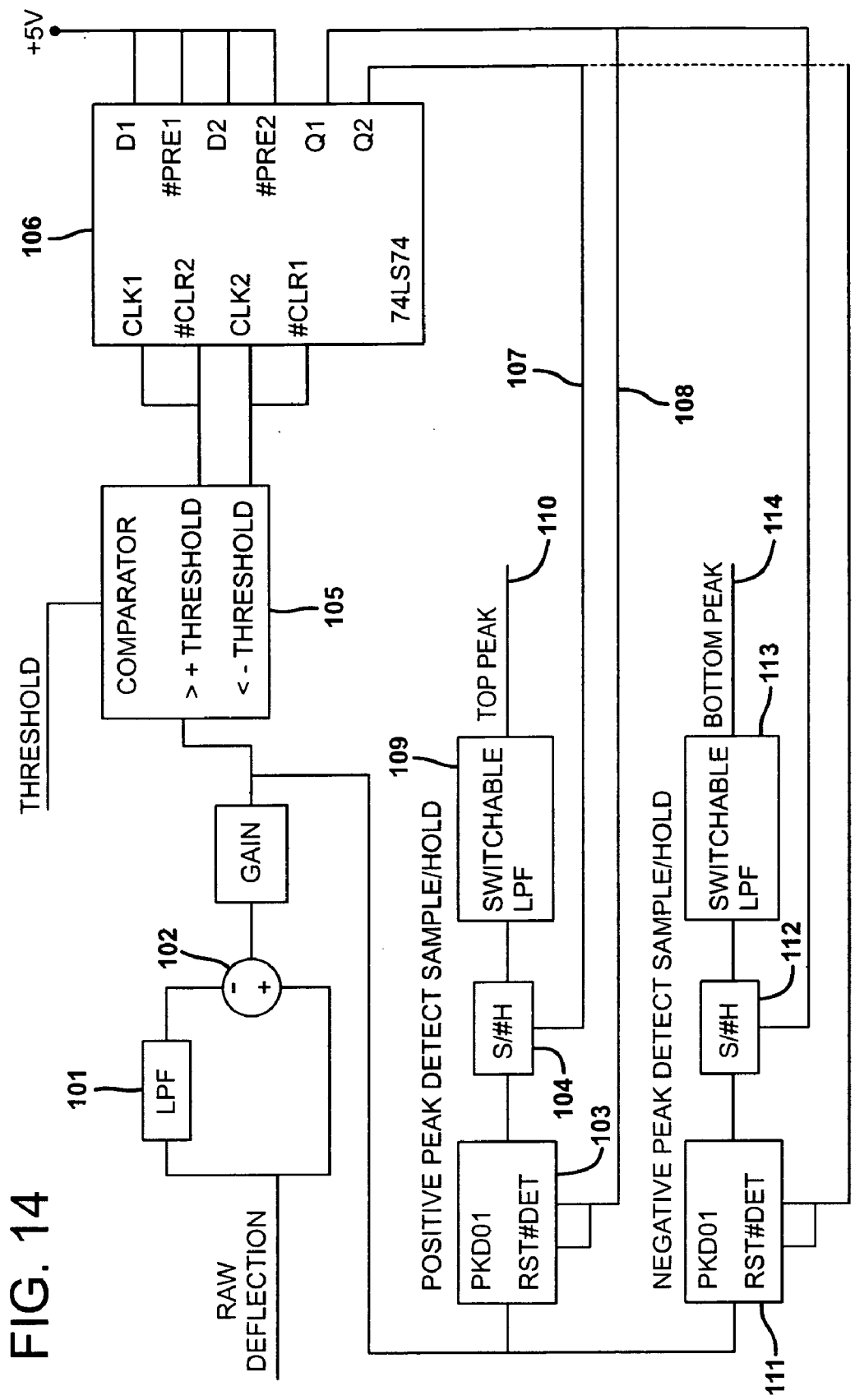
FIG. 14 is a schematic illustration of an analog electronic circuit for another embodiment of the invention that separate topography and recognition images.

In yet another embodiment of the invention, a recognition imaging circuit provides both topographical and recognition imaging signals for an MFRM. As illustrated in FIG. 14, the raw deflection signal from the detector (e.g., 42 in FIG. 11) is passed through a low pass filter 101 to a subtraction circuit 102 where the output is the difference between the low-pass filtered signal and the unfiltered signal. A feature of this circuit is to remove the offset of the oscillating tip-deflection signal caused by drift and other factors. Thus the time constant (RC) of the low pass filter is set to a value comparable to the time taken to scan a line in the microscope (for example, from about 0.1 to about 1.0 seconds).

The raw deflection signal includes a sine wave, corresponding to the probe tip oscillation, superimposed on a fluctuating DC level associated with local changes in the environment. At the output side of low pass filter 101 and subtraction circuit 102, the signal comprises only the sine wave signal, oscillating about zero volts. Thus, the circuit 'filters' out the slow component of the change in the raw deflection signal but leaves the absolute DC value of the signal intact. Using a capacitor in the circuit at this point would distort the waveform.

This filtered or steadied signal is now passed to a peak detector circuit 103. A peak detector circuit records the peak level reached by the input voltage. However, it is desirable to record the change in peak voltage from cycle to cycle, because this change corresponds to the recognition signal. Accordingly, the steadied signal is fed to a comparator 105 to generate a digital signal from the sine wave input from the steadied signal. The threshold voltage at which the comparator fires should be set so that circuit noise will not trigger an output. However, if the threshold voltage is set too high, the input sine wave from the steadied signal will not trigger the comparator.

In order to provide recognition imaging, the probe tip oscillation amplitude must be similar to the length of the flexible tether used to hold the antibody (or other recognition element) to the tip. This, in turn dictates the amplitude of the steadied deflection signal arriving at the comparator 105, given that the electronic gains prior to this stage are fixed for each selected sample to be scanned. We have found that setting the threshold voltage to trigger comparator 105 to be from about 10 to about 70% of the positive part of the steadied signal, a usable recognition-imaging signal is provided. Thus, where the oscillating part of the steadied deflection signal is 1 volt peak to peak at the input to comparator 105, then the threshold voltage should be set at 0.10 to 0.7v, and preferably 0.25 to 0.35V.

The digital waveforms coming from comparator 105 drive a dual D-type flip flop circuit 106. This arrangement causes the output Q1 to pulse when the deflection signal passes the threshold voltage going up and the output Q2 to pulse when the deflection signal passes the threshold voltage going down. These signals (Q2 is shown on line 107 and Q1 is shown on line 108) are fed to a reset signal on the positive peak detector 103 and to the sample control input of a sample and hold circuit 104. Thus, on one cycle, the output of positive peak detector 103 is sampled and then held by sample and hold circuit 104. On the next cycle, positive peak detector 103 is reset. It is then sampled again on the cycle after that.

The result is that the value of the positive peak on every other cycle is displayed on the output of sample and hold circuit 104. This is the recognition signal. The sample and reset operations generate a certain amount of high frequency noise, so the recognition signal may then fed through a low pass filter 109 to generate a final recognition signal 110 that is then fed to an auxiliary display channel of the microscope controller (not shown). Typically, this second low pass filter 109 is set to pass frequencies corresponding to the duration of the recognition signal, but to cut off higher frequencies. Thus, if the recognition signal extends over 1% of a line scan of the image, and the line scan speed is 0.1 seconds, the filter would be set to pass signals below about 1.0 kHz (1/(0.1× 0.001)).

A parallel circuit with a negative peak detector 111, sample and hold circuit 112 and filter 113 generates a signal corresponding to the bottom amplitude of the deflection signal. The bottom amplitude could be used to control the operation of microscope. However, in practice better performance may be obtained if the raw deflection signal is used to control the microscope's sample height servo feedback loop in the normal manner used for AFM imaging. Alternatively, the overall amplitude of the signal may be used as the control for the feedback servo loop. In those cases, bottom peak signal 114 may be used as a diagnostic tool. In normal operation, bottom peak signal 114 should mirror the 'deflection' or 'error' signal obtained by displaying the amplitude of the deflection signal, a signal commonly available on the microscope controller. Proper operation of the microscope may be monitored by checking that the bottom peak signal output 114 and the microscope error signal follow one another.

Figure 15A:
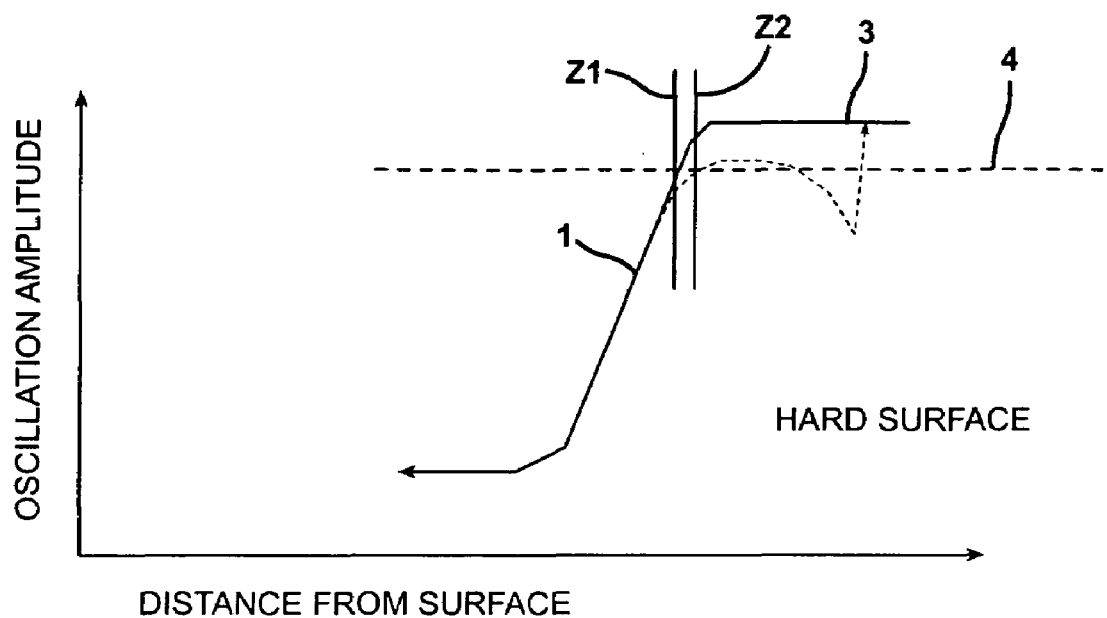
FIGS. 15A and 15B are plots representing probe tip displacement as a probe tip is scanned across hard and soft surfaces, respectively.

The embodiments of the invention described above have been illustrated in terms of the amplitude changes that occur on recognition sites attached to hard surfaces. The present invention is also useful in practicing MRFM on soft surfaces. FIG. 15A summarizes a plot of the oscillation amplitude as an oscillated probe is approached towards a hard surface (solid line) and then retracted after a recognition event (e.g. antibody binding-dashed line). The dashed horizontal line (4) shows the set-point amplitude reduction at which the microscope operates.

Prior to a binding event, the probe tip rests at an average distance Z1 from the surface of a sample. A binding event will cause a drop in the overall oscillation amplitude because of the reduction of the top part of the swing. However, the steep increase of overall amplitude on pushing away from a hard surface (the portion of the curve shown at 1) compensates for the loss of amplitude due to binding with just a small motion of the probe away from the surface. Thus, the new operating point of the microscope (distance Z2) is established at a point (e.g., Z2) that is well within the range where the antibody remains bound (i.e., before the bond is broken as shown at 3).

Figure 15B:
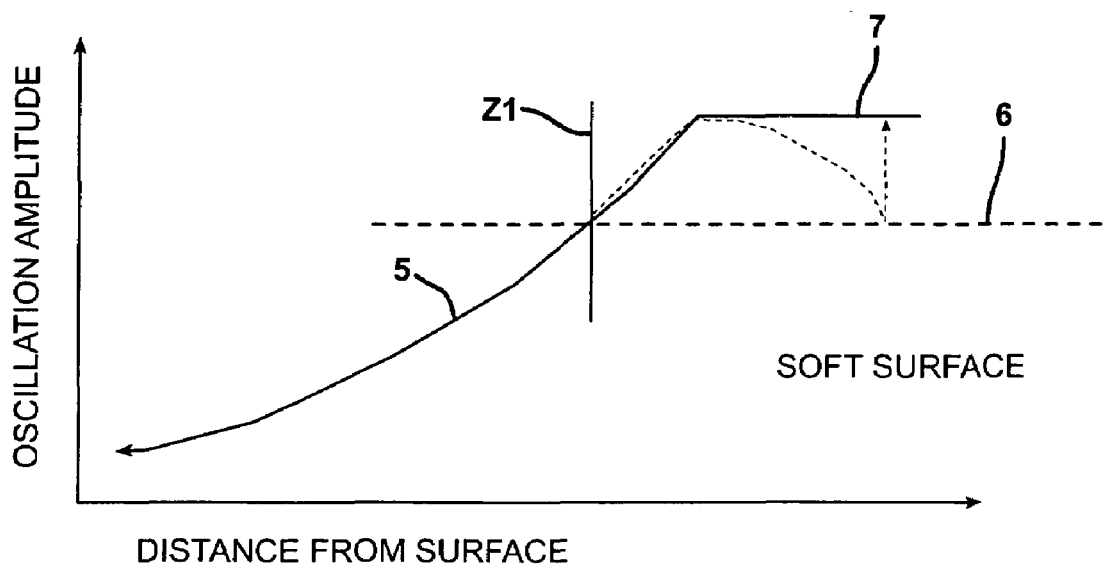

In the case where the sample comprises a soft surface, such as a cell membrane or soft polymer as shown in FIG. 15B, the increase of amplitude with distance moved away from the surface is much smaller (i.e., the slope of the curve in region 5). Once again, dashed line 6 shows the set point, and the operating distance in the absence of binding is Z1. Now, when binding occurs, the probe tip must move much further from the soft surface to recover from a given degree of damping caused by, for example, antibody binding. In those instances where the sample surface is much softer than the antibody tether, the pulling away continues for large distances until the antibody-antigen bond is broken entirely as shown at 7 before a new stable operating point is established. At this point, the probe tip is again advanced to the surface to return to the set point amplitude 6, but re-binding causes the cycle to repeat.

Thus, in the case of a soft surface, a recognition event is characterized by a series of spikes in amplitude. Because the probe tip position is unstable during a recognition event, it is no longer possible to recover a true topography signal. Nonetheless, the large amplitude series of spikes serve as the basis for detecting a recognition event by monitoring the deflection signal as the sample is scanned.

It will be recognized that the present invention enables a very rapid screening process for molecular recognition imaging. The target of interest is tethered to the AFM cantilever probe tip using the methods well known in the art (e.g., using the heterobifunctional linkers as taught by Hinterdorfer et al (1996)). The prospective ligands are arranged in microtiter wells (which could be printed by nanolithographic dip-pen methods) as a close-packed array on an imaging substrate. The array is imaged, recording the recognition signal as a marker of binding strength, while simultaneously recording the topography as an index so that recognition signals can be associated with particular wells.

Alternately, the method can be used to screen the efficacy with which particular ligands bind sites on diseased cells. The ligand is tethered to the cantilever probe tip and cell surfaces are scanned. Comparison between the recognition signals on healthy and normal cells will identify the discrimination of the ligand for diseased cells in addition to locating the specific location of binding sites on the diseased cells.

The invention having being described with reference to preferred embodiments, it will be apparent that the same may be varied in many ways. Such variations are not to be regarded as a departure from the spirit and scope of the invention, and all such modifications as would be obvious to one skilled in the art were intended to be included within the scope of the invention.

What is claimed is:

1. A recognition force microscope for detecting interactions between a probe and a sensed agent on a scanned surface comprising,
    a scanning probe having a tip that has been sensitized with a sensing agent to a property of said surface, said sensing agent bound to said tip by a flexible tether, said probe adapted to oscillate with a low mechanical Q factor;
    means for measuring and recording changes in peak displacement of the probe tip as a function of time comprising,
        a source of radiation directed at said probe;
        a position sensitive detector for detecting radiation reflected from said probe; and
        a processor for processing signals from said detector to determine both topographic images and the spatial location of interactions between said probe and sensed agents on said surface, including means for measuring and recording the amplitude of the upward swing and the amplitude of the downward swing of said probe tip.

2. A microscope as claimed in claim 1 where the Q factor is 20 or less.

3. A microscope as claimed in claim 1 wherein the probe tip is sensitized with a sensing agent that binds specifically to the sensed agent.

4. A microscope as claimed in claim 3 wherein said sensing agent is an antibody.

* * * * *

UNITED STATES PATENT AND TRADEMARK OFFICE
CERTIFICATE OF CORRECTION

PATENT NO.       : 7,152,462 B2
APPLICATION NO. : 11/152827
DATED            : December 26, 2006
INVENTOR(S)      : Hinterdorfer et al.

It is certified that error appears in the above-identified patent and that said Letters Patent is hereby corrected as shown below:

In column 16, line 30, below "antibody."
insert -- 5. A microscope as claimed in claim 4 wherein said antibody is tethered by a flexible crosslinker.
6. A microscope as claimed in claim 3 where said sensing agent is tethered by a flexible crosslinker.
7. A microscope as claimed in claim 1 further comprising:
means for causing the probe to sample distance to vary with time rapidly as compared to the time to move the probe over the surface, said means including a time varying magnetic field.
8. A microscope as claimed in claim 1 in which said processor includes means for determining the average value of the displacement of said probe on a time scale that is sufficiently long compared to changes caused by topography or binding events such that such events are separately recognized;
means for using said average value of said displacement to determine the downward amplitude of said probe from the difference between said average value and the value of the downward displacement;
means for determining the topography of said surface using said value of the downward displacement of said probe; and
means for determining the value of the upward displacement of the probe from the upward amplitude and said average value of said displacement to generate a signal corresponding to interactions between said probe and said one or more sensed agents on the surface being scanned.
9. A microscope as claimed in claim 1 in which said processor includes means for digitizing the recorded displacement of said probe tip;
means for determining the average value of the displacement of said probe on a time scale that is sufficiently long compared to changes caused by topography or binding events such that such events are separately recognized;
means for using said average value of said displacement to determine the downward amplitude of said probe from the difference between said average value and the value of the downward displacement;
means for determining the topography using said value of the downward displacement of said probe; and
means for determining the value of the upward displacement from the upward amplitude and said average value of said displacement to generate a signal corresponding to interactions between said probe and said one or more sensed agents on the surface being scanned.

UNITED STATES PATENT AND TRADEMARK OFFICE
CERTIFICATE OF CORRECTION

PATENT NO.       : 7,152,462 B2
APPLICATION NO.  : 11/152827
DATED            : December 26, 2006
INVENTOR(S)      : Hinterdorfer et al.

It is certified that error appears in the above-identified patent and that said Letters Patent is hereby corrected as shown below:

10. A recognition force microscope for detecting interactions between a probe and a sensed agent on a scanned surface comprising,
a scanning probe having a tip that has been sensitized with a sensing agent to a property of said surface, said sensing agent bound to said tip by a flexible tether, said probe adapted to oscillate with a low mechanical Q factor;
means for measuring and recording changes in peak displacement of the probe tip as a function of time comprising,
a source of radiation directed at said probe;
a position sensitive detector for detecting radiation reflected from said probe; and
    a processor for processing signals from said detector to determine the spatial location of interactions between said probe and sensed agents on said surface, said processor including means for determining the average value of said peak displacement of said probe, and means for determining the value of the upward displacement of said probe to generate a signal corresponding to interactions between said probe and said one or more sensed agents on the surface being scanned. --.

Signed and Sealed this

First Day of May, 2007

JON W. DUDAS
*Director of the United States Patent and Trademark Office*